United States Patent
Nuzman et al.

(10) Patent No.: US 11,863,702 B2
(45) Date of Patent: Jan. 2, 2024

(54) ACOUSTIC ECHO CANCELLATION USING A CONTROL PARAMETER

(71) Applicant: Nokia Technologies Oy, Espoo (FI)

(72) Inventors: Carl Nuzman, Union, NJ (US); Shirin Jalali, Berkeley Heights, NJ (US)

(73) Assignee: Nokia Technologies Oy, Espoo (FI)

( * ) Notice: Subject to any disclaimer, the term of this patent is extended or adjusted under 35 U.S.C. 154(b) by 53 days.

(21) Appl. No.: 17/393,904

(22) Filed: Aug. 4, 2021

(65) Prior Publication Data

US 2023/0046637 A1  Feb. 16, 2023

(51) Int. Cl.
*H04M 3/00* (2006.01)
*H04M 9/08* (2006.01)

(52) U.S. Cl.
CPC ........... *H04M 3/002* (2013.01); *H04M 9/082* (2013.01)

(58) Field of Classification Search
CPC ...... H04M 3/002; H04M 9/085; H04M 9/082; H04R 3/002; G10L 2021/02082
See application file for complete search history.

(56) References Cited

U.S. PATENT DOCUMENTS

| | | | | |
|---|---|---|---|---|
| 5,027,393 A | * | 6/1991 | Yamamura | H04R 3/005 379/406.06 |
| 5,208,864 A | * | 5/1993 | Kaneda | G10L 25/78 704/258 |
| 6,816,592 B1 | | 11/2004 | Kirla | |
| 7,346,012 B2 | | 3/2008 | Stopler | |
| 7,545,926 B2 | | 6/2009 | Mao | |
| 8,385,557 B2 | * | 2/2013 | Tashev | H04R 3/005 379/406.01 |
| 9,699,552 B2 | * | 7/2017 | Kuech | H04R 3/002 |
| 10,482,895 B2 | * | 11/2019 | Lashkari | H04R 3/04 |
| 10,573,301 B2 | * | 2/2020 | Kupryjanow | G10L 21/0232 |
| 10,636,434 B1 | * | 4/2020 | Ramprashad | G10L 25/84 |
| 10,686,942 B2 | * | 6/2020 | Mani | H04L 5/16 |
| 10,978,086 B2 | * | 4/2021 | Wung | G10K 11/178 |
| 11,046,256 B2 | * | 6/2021 | Jain | H04R 1/222 |
| 11,245,983 B2 | * | 2/2022 | Tateishi | H04R 1/021 |

(Continued)

OTHER PUBLICATIONS

Kentaro Koga et al. "Echo Canceller for Multi-Loudspeakers Based on Maximum Likelihood Using an Acoustic Model" Department of Comguter Science and Systems Engineering, Kobe University, Japan [retrieved Apr. 30, 2021].

(Continued)

*Primary Examiner* — Lisa Hashem
(74) *Attorney, Agent, or Firm* — Harrington & Smith

(57) ABSTRACT

Echo cancellation for a two-way audio communication includes receiving, at an AEC system from microphone(s), an audio signal based on, at least in part, near-end signals and reproduced far-end signals. Loudspeaker(s) reproduced the far-end signals. The AEC system is operated, at least in part, with filter(s) so as to update estimates of coefficients of an acoustic channel from the loudspeaker(s) to the microphone(s). Control parameter(s) affecting an operation of the AEC system that is/are configurable and is/are set to value(s), from a range of values, is/are determined, based on estimating an accuracy of the estimates of the coefficients of the acoustic channel and a characteristic of the near-end signals. The AEC system controls the filter(s) with different values of the control parameter(s) at different times.

20 Claims, 10 Drawing Sheets

(56) References Cited

U.S. PATENT DOCUMENTS

| | | | | |
|---|---|---|---|---|
| 11,295,752 | B2* | 4/2022 | Liang | G10L 21/0208 |
| 11,501,795 | B2* | 11/2022 | Sereshki | H04R 3/005 |
| 11,538,451 | B2* | 12/2022 | Sereshki | G10L 21/0208 |
| 11,646,045 | B2* | 5/2023 | Giacobello | G10L 21/0208 |
| | | | | 381/66 |
| 2006/0018459 | A1 | 1/2006 | McCree | 379/406.06 |
| 2010/0057454 | A1 | 3/2010 | Mohammad et al. | 704/233 |
| 2019/0149915 | A1* | 5/2019 | Goldstein | H04R 1/1016 |
| | | | | 381/66 |
| 2023/0199386 | A1* | 6/2023 | Lanneer | G10L 21/0208 |
| | | | | 381/93 |

OTHER PUBLICATIONS

Byung Joon Cho et al. "Stereo Acoustic Echo Cancellation Based on Maximum Likelihood Estimation with Inter-channel-Correlated Echo Comgensation" IEEE Transactions on Signal Processing [retrieved Apr. 30, 2021].

Mahfoud Hamidia et al, "Improving Acoustic Echo Cancellation in Hands-free Communication Systems" USTHB, Faculty of Electronics and Computer Science Speech Communication and Signal Processing Laboratory [retrieved Apr. 30, 2021].

Jason Wung "A Systein Approach to Multi-Channel Acoustic Echo Cancellation and Residual Echo Suppression for Robust Hands-Free Teleconferencing" Georgia Institute of Technology. May 2015.

H. Gnaba-Daasi et al. "A Centralized Acoustic Echo Canceller Based on Perceptual Properties" [retrieved Apr. 30, 2021].

Ochiai et al., "Echo Canceler with Two Echo Path Models", IEEE Transactions on Communications, vol. COM-25, No. 6, Jun. 1977, pp. 589-595.

Benesty, J., Rey, H., Vega, L. R., and Tressens, S. "A nonparametric VSS NLMS algorithm", IEEE Signal Processing Letters, 13(10), 581-584 (2006).

Paleologu, C., Ciochin, S., Bencsty J., and Grant, S. L., "An overview on optimized NLMS algorithms for acoustic echo cancellation", EUROSIP Journal on Advances in Signal Processing, 2015:97 (2015).

Albu, F., Paleologu, C., and Benesty, J., "A variable step size evolutionary affine projection algorithm", in 2011 IEEE International Conference on Acoustics, Speech and Signal Processing (ICASSP) (pp. 429-432), IEEE (May 2011).

Duttweiler, Donald L., "Proportionate Normalized Least-Mean-Squares Adaptation in Echo Cancelers", IEEE Transactions on Speech and Audio Processing, vol. 8, No. 5, Sep. 2000, pp. 508-518.

\* cited by examiner

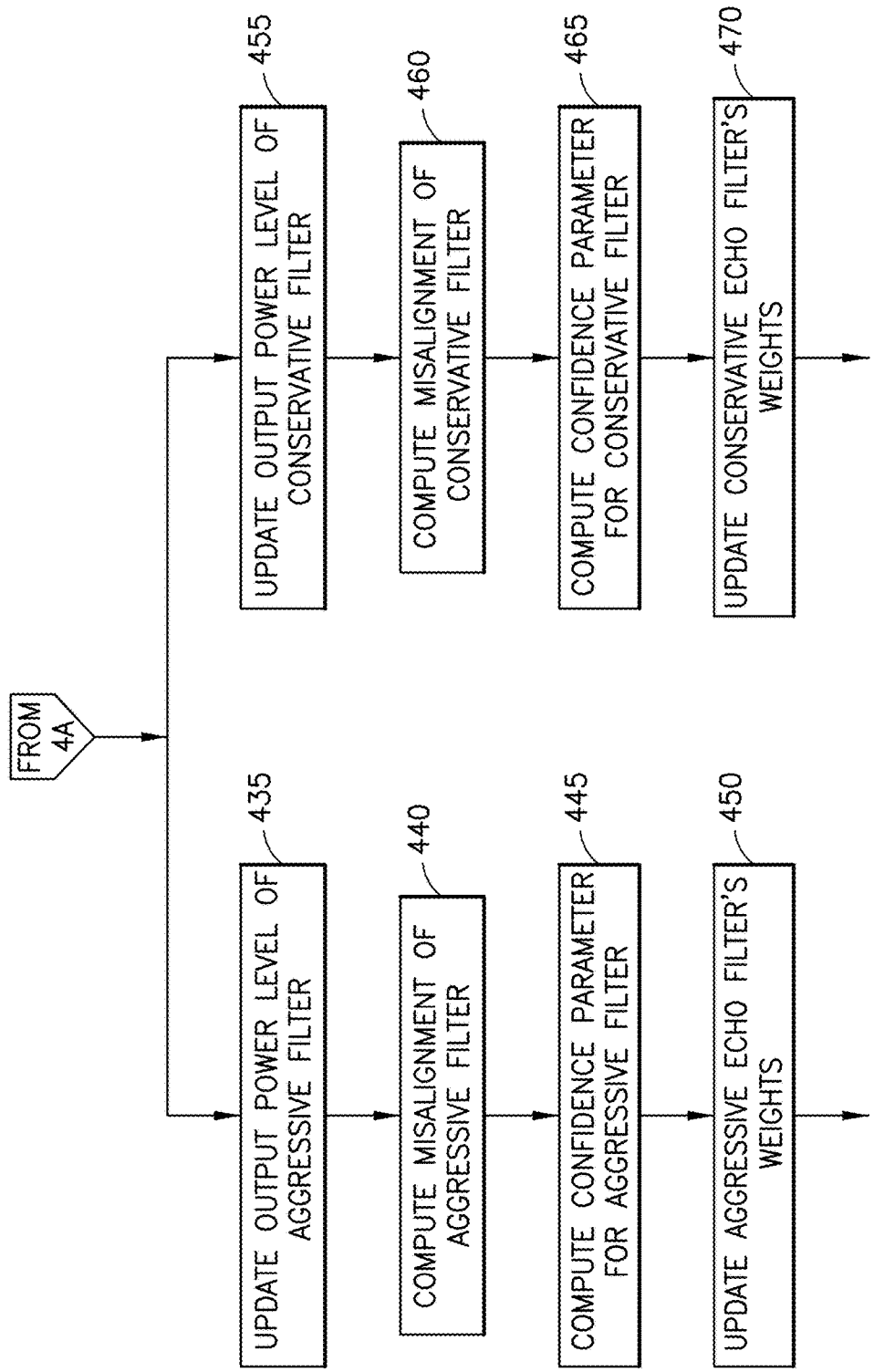

ACOUSTIC ECHO CANCELLATION USING A CONTROL PARAMETER

TECHNICAL FIELD

Exemplary embodiments herein relate generally to Acoustic Echo Cancellation (AEC) and, more specifically, relates to processes and apparatus for performing the AEC possibly using Maximum Likelihood (ML) techniques.

BACKGROUND

In a two-way audio system, there is often a "far end" and a "near end". Consider a person in one room speaking to a colleague in a different location via a video conference. The room is considered to be the "near end" (relative to the person) and the location with the colleague is considered to be the "far end".

Any two-way audio system in which speakers and microphones are not physically isolated (e.g., speakerphone or conference room) in the near end requires echo cancellation to prevent the far-end signal produced by the speakers from feeding back to the far end via the microphones. Such systems are in wide use already today, but new use cases involving spatial audio and immersive experience make the technical problem more challenging.

Desirable properties of an audio echo cancellation system include one or more of the following:

1) an ability to track a rapidly changing physical environment even if the far-end signal is strongly correlated;
2) a very low residual echo after convergence;
3) robustness to the presence of intermittent, strong near-end signals; and
4) acceptable complexity (e.g., linear in the length of the cancellation filter).

BRIEF SUMMARY

This section is intended to include examples and is not intended to be limiting.

In an exemplary embodiment, a method for echo cancellation of a two-way audio communication is disclosed that includes receiving, at an adaptive echo cancellation system from one or more microphones, an audio signal based on, at least in part, near-end signals and reproduced far-end signals. One or more loudspeakers reproduced the far-end signals, The method includes operating the adaptive echo cancellation system, at least in part, with at least one filter so as to update estimates of coefficients of an acoustic channel from the one or more loudspeakers to the one or more microphones. The method also includes determining at least one control parameter affecting an operation of the adaptive echo cancellation system that is configurable and is set to at least one value, from a range of values. The determining at least one control parameter is based on estimating an accuracy of the estimates of the coefficients of the acoustic channel and a characteristic of the near-end signals. The method includes controlling, by the adaptive echo cancellation system, the at least one filter with different values of the at least one control parameter at different times.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to receive at an adaptive echo cancellation system from one or more microphones, an audio signal based on, at least in part, near-end signals and reproduced far-end signals, wherein one or more loudspeakers reproduced the far-end signals; operate the adaptive echo cancellation system, at least in part, with at least one filter so as to update estimates of coefficients of an acoustic channel from the one or more loudspeakers to the one or more microphones; determine at least one control parameter affecting an operation of the adaptive echo cancellation system that is configurable and is set to at least one value, from a range of values, wherein the determining at least one control parameter is based on estimating an accuracy of the estimates of the coefficients of the acoustic channel and a characteristic of the near-end signals; and control, by the adaptive echo cancellation system, the at least one filter with different values of the at least one control parameter at different times.

An exemplary computer program product includes a computer-readable storage medium bearing computer program code embodied therein for use with a computer. The computer program code includes: code for receiving, at an adaptive echo cancellation system from one or more microphones, an audio signal based on, at least in part, near-end signals and reproduced far-end signals, wherein one or more loudspeakers reproduced the far-end signals; code for operating the adaptive echo cancellation system, at least in part, with at least one filter so as to update estimates of coefficients of an acoustic channel from the one or more loudspeakers to the one or more microphones; code for determining at least one control parameter affecting an operation of the adaptive echo cancellation system that is configurable and is set to at least one value, from a range of values, wherein the determining at least one control parameter is based on estimating an accuracy of the estimates of the coefficients of the acoustic channel and a characteristic of the near-end signals; and code for controlling, by the adaptive echo cancellation system, the at least one filter with different values of the at least one control parameter at different times.

In another exemplary embodiment, an apparatus comprises means for performing: receiving, at an adaptive echo cancellation system from one or more microphones, an audio signal based on, at least in part, near-end signals and reproduced far-end signals, wherein one or more loudspeakers reproduced the far-end signals; operating the adaptive echo cancellation system, at least in part, with at least one filter so as to update estimates of coefficients of an acoustic channel from the one or more loudspeakers to the one or more microphones; determining at least one control parameter affecting an operation of the adaptive echo cancellation system that is configurable and is set to at least one value, from a range of values, wherein the determining at least one control parameter is based on estimating an accuracy of the estimates of the coefficients of the acoustic channel and a characteristic of the near-end signals; and controlling, by the adaptive echo cancellation system, the at least one filter with different values of the at least one control parameter at different times.

BRIEF DESCRIPTION OF THE DRAWINGS

In the attached Drawing Figures:

FIGS. 4A and 4B, is a logic flow diagram of a general update process for Embodiment 2;

DETAILED DESCRIPTION OF THE DRAWINGS

Figure 1:
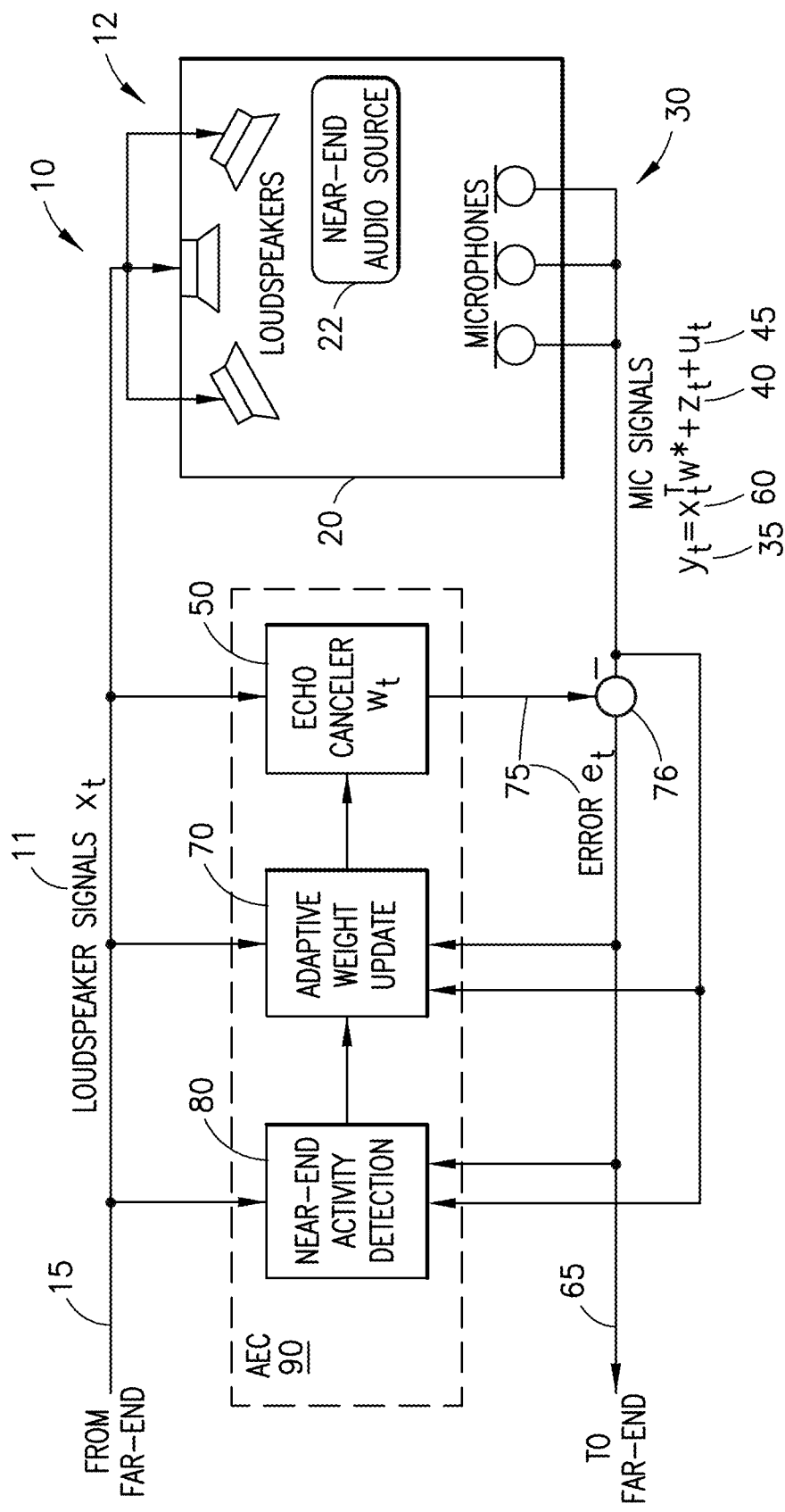
FIG. 1 is a logic flow diagram of an exemplary typical audio system with echo cancellation.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

For the application of systems such as 5G Immersive Voice, it is desirable to leverage multiple speakers and multiple microphones to provide a more realistic audio experience. For example, comprehension can be enhanced by making different remote voices appear to come from different directions.

Exploiting multiple speakers and microphones in large and dynamic physical environments makes the problem of acoustic echo cancellation more challenging, for several reasons:

1) multiple speakers increase the correlation of the far-end signal, slowing convergence;
2) multiple microphones add to computational complexity;
3) a large physical environment adds to the required length of the cancellation filter; and/or
4) a dynamic physical environment increases the required tracking speed of the system.

To enable immersive voice applications, it would be useful to have an echo cancellation method that can simultaneously and automatically achieve rapid tracking, low residual echo, robustness to near-end signals, and low complexity.

For the generic problem of acoustic echo cancellation, there are numerous algorithms. Three key algorithms for adapting the coefficients of an acoustic echo cancellation filter include Least Mean Square (LMS), Recursive Least Square (RLS), and Affine Projection Algorithm (APA). While all of these can be useful, they have the following limitations, which the techniques presented herein seek to address.

1) LMS has poor convergence especially in the face of correlated far-end signals.
2) RLS has excellent performance but quadratic complexity in the filter length.
3) APA has fast convergence but relatively high residual echo after convergence.

Subband methods effectively divide the problem into separate frequency bands. The three methods above can then be applied within each of the subbands. The Weighted Overlap-Add (WOLA) approach falls into this category.

For the LMS algorithm, there is an important scalar parameter known as step size that controls tradeoffs between convergence speed and steady state residual echo. There are several current schemes for adapting the step-size. See for example NP-NLMS and JO-NLMS, in the following: Benesty, J., Rey, H., Vega, L. R., and Tressens, S., "A nonparametric VSS NLMS algorithm", IEEE Signal Processing Letters, 13(10), 581-584 (2006).; and Paleologu, C., Ciochin, S., Benesty J., and Grant, S. L., "An overview on optimized NLMS algorithms for acoustic echo cancellation", EUROSIP Journal on Advances in Signal Processing, 2015:97 (2015). The idea is to use large steps when channel estimation error is high and noise is low, and use small steps when error is low and/or noise is high. In voice-oriented applications, voice-activity detection (VAD) algorithms can be used to determine when a near-end voice signal is present. The VAD can feed into the step size control, making the step size equal to zero (or near to zero) during periods of voice activity, and larger when the near-end voice is silent. This is because high voice activity is expected to overwhelm other signals, and therefore low to no adaptation is selected for these times.

The APA algorithm has two parameters, a step size and a regularization parameter. Conventionally the regularization parameter is set to a small fixed level to avoid numerical ill-conditioning. In principle, the step can be controlled by methods similar to the LMS algorithm. A third parameter is the memory length, often denoted P. Larger values of P are advantageous for fast convergence, but smaller values of P give lower residual echo after convergence. A method for adapting P under different conditions has been proposed in the following: Albu, F., Paleologu, C., and Benesty, J., "A variable step size evolutionary affine projection algorithm", in 2011 IEEE International Conference on Acoustics, Speech and Signal Processing (ICASSP) (pp. 429-432), IEEE (2011, May). Effective methods of choosing or controlling step size, regularization, and P together do not seem to be known.

To address these and other issues, and as an overview, an exemplary proposal herein includes the following three components, although not all components are necessary at the same time. The components are labeled as C1, C2, and C3, for ease of reference.

(C1) A new update rule, Incremental Maximum Likelihood (IML) for adaptively learning the echo channel coefficients in a two-way audio setting. The IML update rule has two parameters: i) a fixed memory order P and ii) a Confidence Parameter (CP) that is set adaptively.

(C2) A theoretically justified practical method for setting CP adaptively based on information available in an audio echo cancellation setting. This update rule can enable IML to have fast convergence and low steady-state error, e.g., if the IML can be operated only in periods of low near-end activity (for example, with the aid of near-end voice activity detection).

(C3) An IML-based echo cancellation method that is, e.g., robust to near-end activity. The method involves running two IML filters in parallel. The two filters may use different assumptions for setting their CPs.

Additional overview is presented now, and more detailed description is related below.

Exemplary embodiments relate to hands-free communication in mobile devices where one (or more) loudspeakers are provided in order to convey far-end sound to the near-end user, and one (or more) microphones are provided to capture near-end sound to be conveyed to the far-end user. An echo cancellation module is provided to prevent the far-end sound from propagating back to the far-end user via the chain of loudspeakers, local acoustic channel, and microphone. An adaptive mechanism for the echo cancellation module is provided that uses a window of P past samples to form a multi-dimensional statistical model of uncertainty in the channel estimate, and updates the filter coefficients to the maximum likelihood estimate under that model. This mechanism is referred to herein as the Incremental Maximum Likelihood (IML) algorithm. The mechanism has a control parameter, which we refer to as the confidence parameter, which can be modified to reflect the changing balance between level of uncertainty in the channel estimate and the power level of the near-end signal. See component (C1) above. Various embodiments differ in the way that the confidence parameter is modified based on available information, e.g., using components (C2, C3).

One aspect addressed by exemplary embodiments is that the confidence parameter has a theoretical optimal value, that can be estimated by various techniques in different embodiments. In particular, analysis shows that the confidence parameter may be set, e.g., equal to the ratio of the residual far-end signal power to the near-end signal power. This ratio is referred to herein as the RFNR (residual far-end to near-end ratio). Setting the confidence parameter of the IML mechanism equal to an estimated RFNR allows the adaptive mechanism to behave differently in different situations, thus combining in one mechanism positive features of some other well-known adaptive mechanisms. For example, when the RFNR is high and confidence parameter set accordingly, IML updates are almost identical to APA updates, that are able to quickly reduce high residual echo levels. When the RFNR is low and confidence parameter is set accordingly, IML updates are almost identical to LMS updates with a small step size, which are robust to high near-end noise levels and achieve low residual echo. For intermediate values of RFNR, IML updates provide intermediate behaviors that are not captured by either APA or LMS alone. When the IML algorithm is operated with the confidence parameter set approximately equal to the RFNR, exemplary embodiments provide both fast convergence and low residual echo after convergence. Like APA and LMS, the complexity of IML is only linear in the length of the echo cancellation filter. Note that anytime the term "equal" is used herein this may be implied in many examples to be substantially equal, such as being within some (e.g., relatively small) threshold of being equal. For example, the confidence parameter may be set substantially equal to the RFNR, such as being within a threshold of one or a few percent or less.

The RFNR is not directly observable, and various embodiments differ according to the way that the RFNR is estimated. By "directly observable", this means the RFNR is hard to estimate from data, such as being not measurable or challenging to measure. In voice-oriented applications where an accurate VAD module is available, the RFNR can be estimated based on a flat background noise model when the near-end speaker is inactive, and can simply be assumed to be very low when near-end voice activity is detected (see component C2). In applications where accurate VAD is not available, for example when the near-end signal is not just a voice signal, the confidence parameter can be effectively controlled using a pair of parallel echo cancellation filters. One filter is controlled with an aggressive estimate of RFNR, the other is controlled with a conservative estimate of RFNR, and both are frequently synchronized (see point C3). The aggressive estimate uses a higher confidence parameter and the conservative estimate uses a lower confidence parameter, in an exemplary embodiment.

Technical effects of parts of the techniques presented herein include the following.

Possible effects of the component C1 include the following. When the confidence parameter is set approximately equal to the residual far-end to near-end ratio, the IML update rule achieves, on average, a lower residual far-end signal than can be achieved with APA or NLMS, with complexity much lower than optimal methods such as RLS.

Possible effects of the components C1 and C2 together include the following. In applications where periods of strong near-end activity are known or can be effectively estimated, an echo canceller operating with C1 and C2 achieves fast reduction in residual echo after a change in acoustic channel conditions (or at initialization), while also achieving very low residual echo when the channel is stable. The fast reduction is based on a similarity to the reduction for APA and having a faster reduction than LMS. The low residual echo is based on similar residual echo to that achieved by LMS, and lower than that achieved by APA.

Possible effects of the components C1 and C3 together comprise the following. In general applications, an echo canceller operating with C1 and C3 achieves fast reduction in residual echo after a change in acoustic channel conditions (or at initialization), while also achieving very low residual echo when the channel is stable, while also maintaining low residual echo during periods of high near-end activity.

Now that an overview has been provided, additional details are provided.

Before proceeding with additional details, certain of the concepts presented below are characterized in mathematical form. The following table is a reference guide to the parameters and their corresponding exemplary meanings:

| Parameter | Meaning |
|---|---|
| $x_t$ | latest loudspeaker signal vector |
| $y_t$ | latest microphone measurement |
| $P - 1$ | number of previous loudspeaker and microphone measurements used in the coefficient update algorithm |
| $w_t$ | current estimate of echo channel's coefficients (also referred to as a weight vector) |
| $c_t$ | confidence parameter |
| $w^*$ | channel between the loudspeaker and microphone |
| $z_t$ | additive Gaussian noise with variance $\sigma_z^2$ |
| $u_t$ | the signal of the near-end user |
| $a_t$ | output of the VAD, 0/1 for hard VAD, 0 to 1 for soft VAD |
| $(w_t - w^*)^T x_t$ | residual echo |
| $e_t$ | echo canceller output signal |
| $m_t$ | misalignment parameter |
| $s_t$ | far-end signal strength |
| $p_t$ | output power |
| $v_t = p_t - m_t s_t$ | near-end signal strength |
| $x_t^T w^*$ | far end signal |
| $n_w$ | the number of coefficients in $w_t$ |

This table is provided for ease of reference, and is not meant to be exhaustive or limiting. Also, these parameters may be referred to using other names at times.

Consider the setup shown in FIG. 1. FIG. 1 is a block diagram of an exemplary typical audio system with echo cancellation. There is a signal 15 from the far end and a signal 65 to the far end. The audio system 10 comprises the speaker array 12 (having three speakers in this example), a microphone array 30 (having three microphones in this example), the Acoustic Echo Canceller (AEC) 90, and an adder 76. The AEC 90 in this example includes an echo canceler module 50 having coefficients $w_t$, an adaptive weight update function 70, and a near-end activity detection module 80. The arrays 12 and 30 may have from one element to many elements, and the numbers of elements of each of the arrays 12, 30 need not be the same.

The signal 15 from the far end comprises loudspeaker signals $x_t$ 11, and the microphone (mic) signals $y_t$ 35 comprise noise signals $z_t$ 40, a near-end signal $u_t$ 45, and a far end signal $x_t^T w^*$ 60 having the echo. The $w^*$ represents the channel between the loudspeaker(s) 12 and microphone(s) 30. In this example, the environment for the system 10 is within a room 20 and the near-end signal 45 is created at least by the near-end audio source 22, such as a user (not shown).

The echo canceler 50, using and applying the coefficients $w_t$, produces an echo estimate $x_t^T w_t$ 75 that is subtracted by the adder 76 from the microphone signals 35 to create the echo cancelation output $e_t$ 65. The adaptive weight update function 70 updates the coefficients $w_t$, which may also be considered to be weights. The near-end activity detection module 80 performs VAD, and outputs to the adaptive weight update function 70 either a hard output (e.g., zero for no voice detected, one for voice detected) or a number between (and possibly including) zero and one. Responsive to this, the adaptive weight update function 70 would perform or not perform updating, e.g., using different step sizes if used.

Figure 1A:
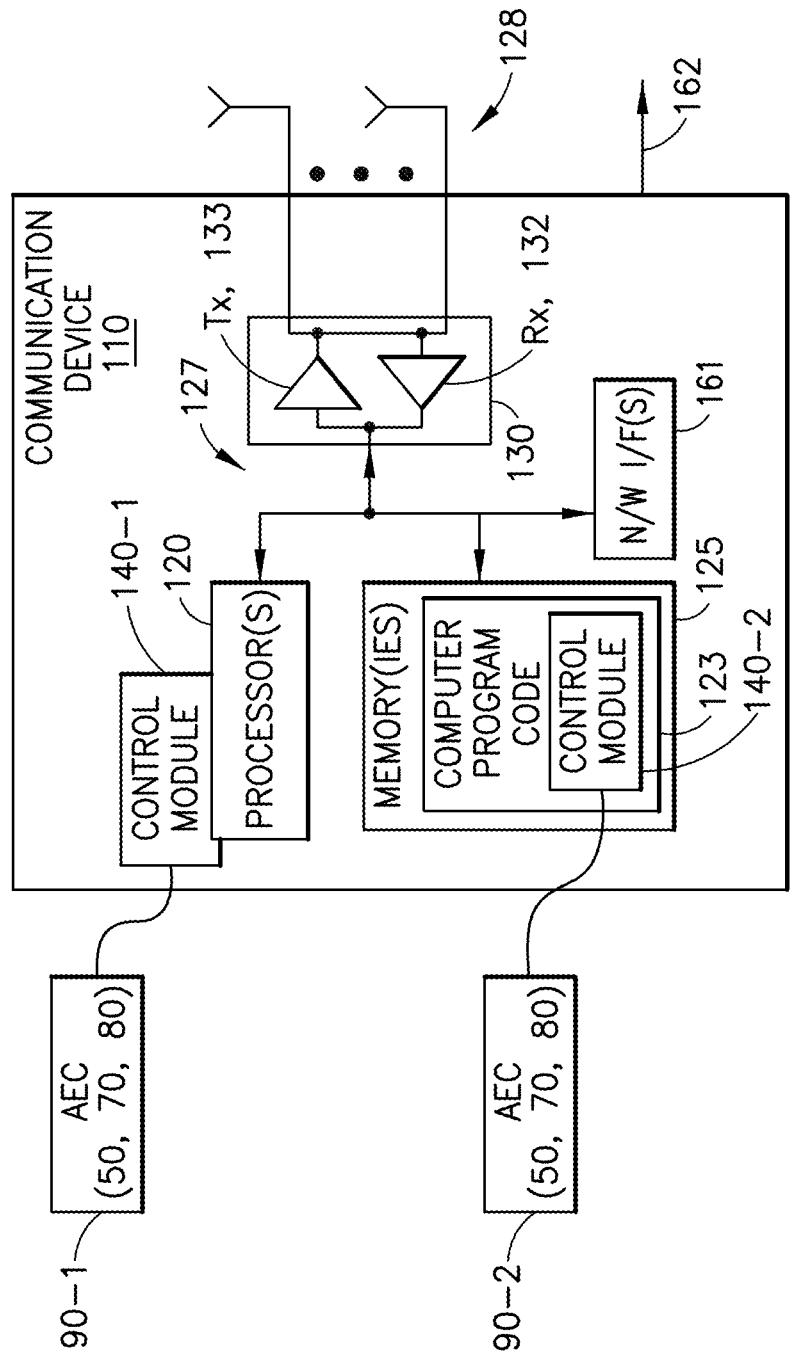
FIG. 1A is a block diagram of a communication device suitable for implementing echo cancellation in accordance with an exemplary embodiment.

FIG. 1A is a block diagram of a communication device 110 suitable for implementing echo cancellation in accordance with an exemplary embodiment. One example of a communication device 110 is a wireless, typically mobile device that can access a wireless network. The communication device 110 includes one or more processors 120, one or more memories 125, one or more transceivers 130, and one or more network (N/W) interfaces (IF(s)) 161, interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like.

The communication device 110 may be wired, wireless, or both. For wireless communication, the one or more transceivers 130 are connected to one or more antennas 128. The one or more memories 125 include computer program code 123. The N/W I/F(s) communicate via one or more wired links 162.

The communication device 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The AEC 90 may be similarly implemented as echo canceler module 90-1 as part of control module 140-1, as echo canceler module 59-2 as part of control module 140-2. The AEC 90 typically includes the echo canceler module 50 and the adaptive weight update function 70, and may or may not include the near-end activity detection module 80.

The computer readable memories 125 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 125 may be means for performing storage functions. The processors 120 may be of any type suitable to the local technical environment, and may include one or more of general-purpose computers, special purpose computers, microprocessors, digital signal processors (DSPs) and processors based on a multi-core processor architecture, as non-limiting examples. The processors 120 may be means for performing functions, such as controlling the communication device 110, and other functions as described herein.

In general, the various embodiments of the communication device 110 can include, but are not limited to, cellular telephones (such as smart phones, mobile phones, cellular phones, voice over Internet Protocol (IP) (VoIP) phones, and/or wireless local loop phones), tablets, portable computers, room audio equipment, immersive audio equipment, vehicles or vehicle-mounted devices for, e.g., wireless V2X (vehicle-to-everything) communication, image capture devices such as digital cameras, gaming devices, music storage and playback appliances, Internet appliances (including Internet of Things, IoT, devices), IoT devices with sensors and/or actuators for, e.g., automation applications, as well as portable units or terminals that incorporate combinations of such functions, laptops, laptop-embedded equipment (LEE), laptop-mounted equipment (LME), Universal Serial Bus (USB) dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. That is, the communication device 110 could be any device that may be capable of wireless or wired communication.

Assume that there is a single loudspeaker (in array 12) and a single microphone (in array 30). The algorithm generalizes to the case of multiple loudspeakers and/or multiple microphones in a straightforward fashion. At time t, the AEC 90 receives as input the following:

1) A latest loudspeaker signal vector: $x_t=[x_t, \ldots, x_{t-n_w+1}]^T \in R^{n_w}$, wherein $n_w$ is the number of coefficients in $w_t$ and R is a set of real vectors of length $n_w$.

2) A latest microphone measurement: $y_t \in R$.

3) P−1 previous loudspeaker and microphone measurements: $(x_{t'}, y_{t'})$ for t'=t−1, ..., t−P+1.

4) A current estimate of echo channel's coefficients $w_t$.

It is now described how the proposed echo cancelation method, i.e., IML, updates $w_t$ as a function of its inputs.

Define $n_w \times P$ matrix $X_t=[x_t, \ldots, x_{t-P+1}]$ and $P \times 1$ vector $$Y_t = \begin{bmatrix} y_t \\ \vdots \\ y_{t-P+1} \end{bmatrix}.$$

Also, define $n_w \times (P-1)$ matrix $U_{t-1}=[x_{t-1}, \ldots, x_{t-P+1}]$. (Note that $U_{t-1}$ is $X_t$ without the first column.)

Given confidence parameter $c_t$, define a normalization factor parameter as the following:

$$\alpha_t = (\|x_t\|^2 + c_t^{-1} x_t^T U_{t-1} (c_t^{-1} I_{P-1} + U_{t-1}^T U_{t-1})^{-1} U_{t-1}^T x_t)^{-1}.$$

Then, IML updates the coefficients $w_t$ as the following:

$$w_{t+1} = w_t + \alpha_t (I_L - U_{t-1}(U_{t-1}^T U_{t-1} + c_t^{-1} I_{P-1})^{-1} U_{t-1}^T) x_t (y_t - x_t^T w_t).$$

With respect to the confidence parameter (CP), the only parameter in the description of IML is the confidence parameter $c_t$. First, it is described how this parameter should be set ideally. Assume that the channel between the loudspeaker and microphone can be described by $w^* \in R^{n_w}$ and therefore, $$y_t = x_t^T w^* + z_t + u_t,$$

where $z_t$ denotes the additive Gaussian noise with variance $\sigma_z^2$ and $u_t$ denotes the signal of the near-end user. First, consider the case where the near end user is silent and $u_t=0$. In this case, it is ideally desirable to set the parameter $c_t$ as $$c_t = \frac{\|w_t - w^*\|^2}{n_w \sigma_z^2}.$$

Setting the parameter as such requires having access to $w^*$, which is not available. Before a practical method is explained to set parameter $c_t$, two extreme cases are reviewed, which shed light on IML.

The first case relates to the following:

$$\frac{1}{n_w}\|w_t - w^*\|^2 \gg \sigma_z^2.$$

In this case, misalignment error $\|w_t - w^*\|^2$ dominates additive noise and $c_t$ should be made very large, with $c_t^{-1}$ set close to zero. This happens at the beginning of a communication session, when the echo canceller does not have a reliable estimate of the coefficients. In the extreme case of $c \to \infty$, one can show that IML reduces to standard APA with no regularization. More generally, in this regime $c^{-1}$ plays a role analogous to the regularization parameter in regularized APA.

The second case relates to the following:

$$\frac{1}{n_w}\|w_t - w^*\|^2 \ll \sigma_z^2.$$

In this case, the system has a good estimate of the echo channel coefficients $w^*$ and additive noise is dominant. In this case, $c_t$ is set to a small value and IML reduces to LMS with a small step size c.

The two extreme cases show that IML can be explained as a smart adaptive interpolation between APA and LMS, depending on the accuracy of the channel estimate and also the level on noise in the measurements.

Concerning setting the confidence parameter, as mentioned earlier, ideally IML sets the parameter $c_t$ based on the power of misalignment at time t. But this is not available in practice. A practical alternative that is inspired by the ideal choice is to set $c_t$ as $$\frac{\frac{1}{T} \sum_{t'=t-T+1}^{t} (x_{t'}^T w_{t'} - y_{t'})^2}{\sigma_z^2}.$$

This practical choice worked well in experiments.

Regarding connection of IML to MLE, to understand IML and its derivation, regularized APA (R-APA) is reviewed. R-APA updates coefficients $w_t$ as follows:

$$w_{t+1} = w_t + X_t(\delta I_P + X_t^T X_t)^{-1}(Y_t - X_t^T w_t).$$

Here, $\delta$ denotes the regularization parameter. Define $n_w \times n_w$ matrix $P_t$ as $$P_t = I - X_t(I + X_t^T X_t)^{-1} X_t^T.$$

Starting at $w_0=0$, at iteration t the following occurs $$w_t = w^* + \Pi_{i=0}^{t-1} P_i w^* + \Sigma_{i=0}^{t-1} \Pi_{j=i+1}^{t-1} P_j X_i(\delta I_P + X_i^T X_i)^{-1} Z_i,$$

where $Z_t = [z_t, \ldots, z_{t-P+1}]^T$. $P_t$ is a matrix with $n_w - P$ eigenvalues equal to one and P eigenvalues strictly smaller than one. This characterization shows that the bias in $w_t$, i.e., $\Pi_{i=0}^{t-1} P_i w^*$, converges to zero at an exponential rate. Therefore, approximately, $w_t$ could be modeled as $N(0_{n_w}, M_t)$, where the $n_w \times n_w$ matrix $M_t$ denotes the covariance matrix of $w_t$. Now assuming that $w_t \sim N(w_o, M_t)$ and $Y_t = X_t^T w_o + Z_t$, the maximum likelihood estimation (MLE) of $w_o$ is as follows:

$$w_{t+1} = w_t + M_t X_t (\sigma_z^2 I_P + X_t^T M_t X_t)^{-1} (Y_t - X_t^T w_t).$$

To simplify this ML-based update rule, assume that $M_t = \sigma_w^2 I_{n_w}$. Then, the following occurs:

$$w_{t+1} = w_t + X_t(\delta_{ML} I_P + X_t^T X_t)^{-1}(Y_t - X_t^T w_t),$$

where $$\delta_{ML} = \frac{\sigma_z^2}{\sigma_w^2}.$$

In practice $\sigma_w^2$ can be approximated as $$\frac{1}{n_w} \|w^* - w_t\|^2.$$

To further improve this ML-based approach, notice that in this derivation, the past P observations have been treated equally. However, the latest observation $(x_t, y_t)$ is the new one that is not used in the estimation of $w_t$. Moreover, here, it is simply assumed that $M_t$ is a diagonal matrix. To derive a yet better update rule, it is proposed to use IML, which employs MLE at two steps: first to estimate $M_t$ based on P−1 past observations and, second, to update $w_t$ using the latest observation together with the derived estimate $M_t$.

Several embodiments are introduced and examined now. In particular, a first (Embodiment 1) and a second (Embodiment 2) embodiments are described.

Embodiment 1 addresses robustness to near-end signal via Voice Activity Detection (VAD). In some voice-oriented applications, the near-end signal voice signal $u_t$ can be modelled as a random process that is either on or off. Various voice activity detection methods can be used to detect whether the near-end voice is on or off. In the case of hard VAD, the output of the voice activity detection module can be denoted $a_t=1$ when voice activity is detected, and $a_t=0$ when no voice activity is detected, where an "a" is used to indicate activity. With soft VAD, $a_t$ could take on any value between 0 (zero) and 1 (one), to reflect the estimated probability that a voice signal is active.

Figure 2:
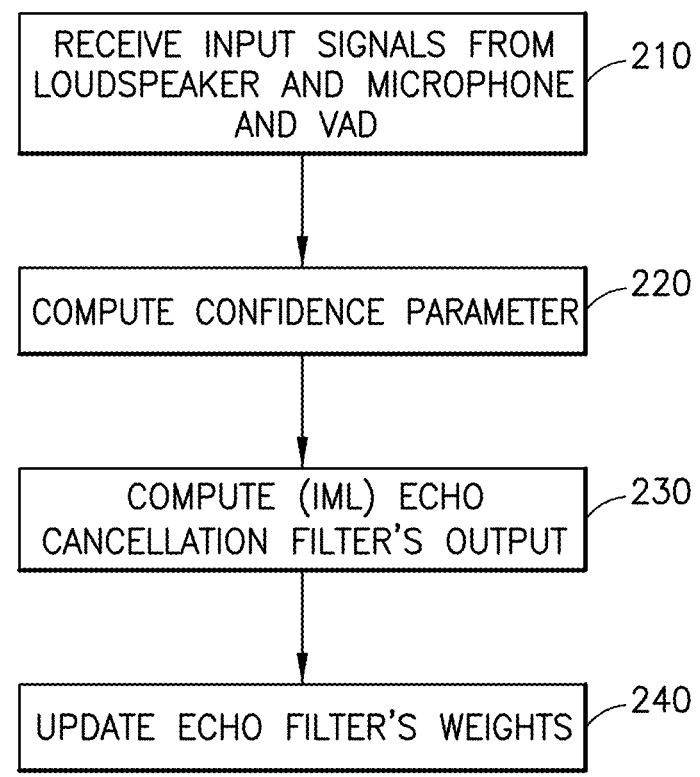
FIG. 2 is a logic flow diagram of a first embodiment referred to as Embodiment 1.

FIG. 2 is logic flow diagram of a first embodiment referred to as Embodiment 1. FIG. 2 illustrates the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 2 are assumed to be performed by a communication device 110, under control of the AEC 90 and the control module 140.

In block 210, the communication device 110 receives input signals for the loudspeaker(s) (loudspeaker signal(s) 11 in FIG. 1), the microphone(s) (mic signal(s) 35), and VAD (via the near-end activity detection module 80).

One exemplary embodiment then works at each time step t as follows (see also FIG. 2):

The raw confidence parameter is calculated (block 220) as $$\tilde{c}_t = \frac{\frac{1}{T}\sum_{t'=t-T+1}^{t}(x_{t'}^T w_{t'} - y_{t'})^2}{\sigma_z^2}.$$

The voice activity detection module provides the value $a_t$. The combined confidence parameter is calculated as $c_t = \tilde{c}_t (1-a_t)$. The updated weight vector $w_{t+1}$ is calculated (block 230) via an IML update step with confidence $c_t$. One example uses the convention that an update with $c_t=0$ is interpreted as the limit of the IML update equation as $c_t \to 0$, namely an LMS update with step size zero: $w_{t+1} = w_t$. This may be performed by the adaptive weight update function 70 of FIG. 1, which may also perform the updating of the echo filter's weights in block 240. This updating modifies the response of the echo canceler module 50 accordingly.

The second embodiment, Embodiment 2, is now described. This embodiment provides robustness to near-end signal without requiring Voice Activity Detection (VAD). That is, in some applications, a Voice Activity Detection (VAD) unit may not be available or sufficient. For example, in some applications, the near-end signal 45 may be a continuous signal with variable strength—for example in the case of music or other ambient noises. In this case, it is beneficial to able to track a changing channel even in the presence of the near-end signal, but appropriate tradeoffs between tracking speed and accuracy may be made.

In such a scenario, when the power level coming out of the echo canceller increases, it is difficult to tell if the increased power is because of an increase in the strength of the near-end signal $u_t$ or due to an increase in residual echo $(w_t - w^*)^T x_t$, say due to changes in the channel response $w^*$. In the former case, it would be desirable to perform an IML update with low confidence, to prevent the strong near-end signal from corrupting the (already accurate) weight vector $w_t$. In the latter case, it would be desirable to perform an IML update with high confidence, to correct the (inaccurate) weight vector $w_t$ as quickly as possible.

Because of the difficulty of distinguishing the two cases in advance, a method is proposed herein in which both courses of action are attempted in parallel. The results of these two approaches are compared frequently, at which point the appropriate action is clear in "hindsight". The echo cancellation normally outputs the result of the low confidence branch, but switches to the high confidence branch when this branch shows superior performance. In this way, robustness is achieved to strong near-end signals and fast response to channel response changes.

Figure 3:
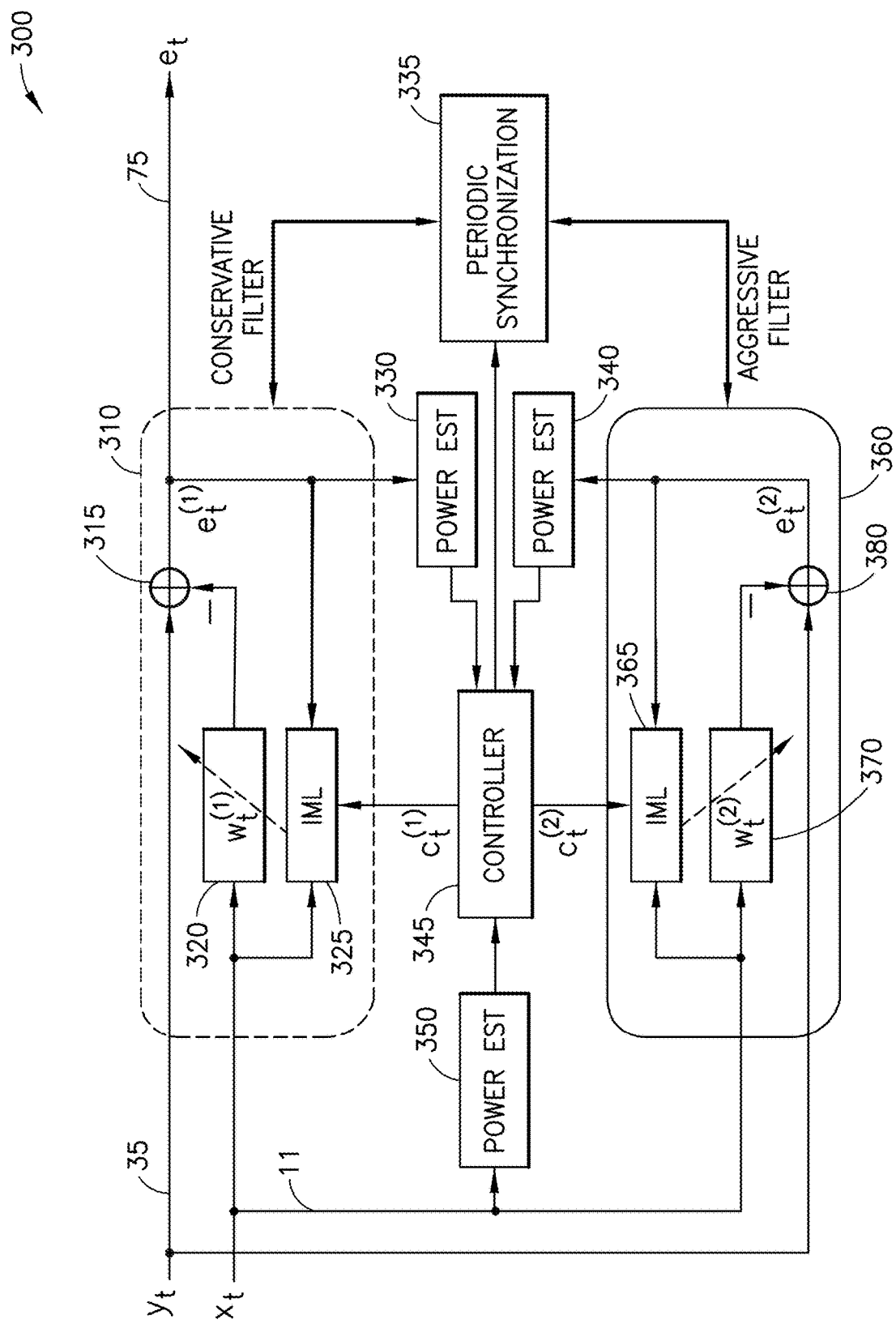
FIG. 3 is a block diagram of an echo cancellation module of a second embodiment referred to as Embodiment 2, in accordance with an exemplary embodiment.

This approach is now described in more detail. Turning to FIG. 3, this figure is a block diagram of an AEC 300 of a second embodiment referred to as Embodiment 2, in accordance with an exemplary embodiment. In this example, the AEC 300 does not include the near-end activity detection module 80. In FIG. 3, there are two filters: a conservative filter 310 and an aggressive filter 360. The conservative filter 310 has coefficients $w_t^{(1)}$, which are adjustable as indicated by reference 320 and produce output $e_t^{(1)}$ after addition via adder 315 with the mic signals 35. The aggressive filter 360 has coefficients $w_t^{(2)}$, which are adjustable as indicated by reference 370 and produce output $e_t^{(2)}$ after addition via adder 380 with the mic signals 35. The conservative filter 310 has an adder 315 having an output of $e_t^{(1)}$, an EVIL module 325, and the aggressive filter 360 has an adder 380 having an output of $e_t^{(2)}$ and an IML module 365. There is a controller 345, several power estimators (est) 330, 340, and 350, and a periodic synchronization block 335. Based at least on the estimation of power from the power estimator 350, the control 345 produces a confidence parameter $c_t^{(1)}$ for the conservative filter 310 and its IML module 325, and produces a confidence parameter $c_t^{(2)}$ for the aggressive filter 360 and its IML module 365. The IML modules 325, 365 are examples of the adaptive weight update function 70. References 320 and 370 are examples of the echo canceler module 50, each producing its corresponding error outputs $e_t^{(1)}$ or $e_t^{(2)}$, respectively.

In brief, the conservative filter 310 applies the filter weights $w_t^{(1)}$ (see reference 320) to the loudspeaker signal $x_t$ and subtracts the result from the microphone signal $y_t$. An IML module 325 adapts the filter weights based on a confidence parameter $c_t^{(1)}$ provided by the controller 345. A similar structure at the bottom implements the aggressive filter 360, where adaptation is based on confidence parameter $c_t^{(2)} \geq c_t^{(1)}$. That is, the aggressive filter 360 applies the filter weights $w_t^{(2)}$ (see reference 370) to the loudspeaker signal $x_t$ and subtracts the result from the microphone signal $y_t$. An IML module 365 adapts the filter weights based on a confidence parameter $c_t^{(2)}$ provided by the controller 345. The periodic synchronization module 335 periodically compares the performance of the two filters replaces the parameters of the worse-performing filter with the parameters of the better one. The periodic synchronization module 335 performs the logic flow in FIG. 5.

Two parallel echo cancellation filters 310, 360 are maintained in this example, the conservative filter with $w_t^{(1)}$ and the aggressive filter with $w_t^{(2)}$. The corresponding echo canceller outputs are $e_t^{(j)} = y_t - w_t^{(j)T} x_t$, for j=1,2. The output power of each filter can be computed via the exponential average $p_t^{(j)} = (1-\mu)p_{t-1}^{(j)} + \mu(e_t^{(j)})^2$.

Assuming that the far-end and near-end signals are statistically independent, and for fixed filter coefficients, the output power is the sum of the near-end signal power and residual far-end echo power. Thus, if one filter has lower output power than the other (e.g., as determined by the power estimators 330, 340), that filter must have lower residual far-end echo, and hence the filter with lower output power is preferred. This is one example of how one can determine whether which of the two branches is to be preferred at any point in time.

However, when the filters are being continuously adapted, this approach is biased and needs correction. This is because the current filter $w_t^{(j)}$ depends on past observations ($y_\tau, x_T$) $\tau < t$, which in turn are typically strongly correlated with the current observation ($y_t, x_t$). To correct for this bias, the innovation observation is computed, which is a transformed observation ($\tilde{y}_t, \tilde{x}_t$), in which the far end signal $\tilde{x}_t$ is (nearly) orthogonal to the previous P−1 observations $U_{t-1} = [x_{t-1}, \ldots, x_{t-P+1}]$.

Given the current far-end signal $x_t$, past far-end-signals $U_{t-1}$, and (e.g., a high level of) confidence parameter c, the transformed loudspeaker signal may be computed as follows:

$$\tilde{x}_t = (I_L - U_{t-1}(U_{t-1}^T U_{t-1} + c^{-1} I_{P-1})^{-1} U_{t-1}^T)x_t := x_t - U_{t-1} b_t,$$

where the following definition is used: $b_t = (U_{t-1}^T U_{t-1} + c^{-1} I_{P-1})^{-1} U_{t-1}^T x_t$.

If $c^{-1} = 0$, we have $U_{t-1}^T \tilde{x}_t = 0$, meaning the transformed far end signal is orthogonal to the recent past far-end signals. More generally, when $c^{-1}$ is small, this is approximately true. To obtain a hypothetical measurement $\tilde{y}_t$ that would have been received if $\tilde{x}_t$ had been transmitted, the coefficients $b_t$ are used to form the microphone signal as $\tilde{y}_t = y_t - [y_{t-1}, \ldots, y_{t-P+1}]b_t$.

The transformation process reduces the statistical dependence between ($\tilde{y}_t, \tilde{x}_t$) and recent past measurements. Thus, if transformed errors $\tilde{e}_t^{(j)} = \tilde{y}_t - w_t^{(j)T} \tilde{x}_t$ and corresponding transformed output powers $\tilde{p}_t^{(j)} = (1-\mu)\tilde{p}_{t-1}^{(j)} + \mu(\tilde{e}_t^{(j)})^2$ are computed, a more reliable measure is achieved for comparing the quality of the two echo filters $w_t^{(1)}$ and $w_t^{(2)}$.

Some notation and analysis are also needed to explain how the confidence parameter of the aggressive filter is estimated. The echo canceller output signal is the following:

$$e_t = y_t - w_t^T x_t = (w^* - w_t)^T x_t + z_t.$$

Assume for simplicity that $E[(w^* - w_t)(w^* - w_t)^T] = m_t I$, for some time-varying misalignment parameter $m_t$. If it is also assumed that $w_t$, $x_t$, and $z_t$ are statistically independent, then we would have the following:

$$p_t := E[e_t^2] = m_t s_t + v_t,$$

where $s_t = E[x_t^T x_t]$ captures the far-end signal strength and $v_t = E[z_t^2]$ is the near-end signal strength.

Note that the output power $p_t$ and far-end signal strength $s_t$ are empirically observable, and that one would like to know $m_t$ and $v_t$ to form the ratio $c_t = m_t / v_t$. Given $v_t$, one can compute the misalignment as the following:

$$m_t = \frac{p_t - v_t}{s_t},$$

and given the misalignment, one can compute the near-end signal power as the following:

$$v_t = p_t - m_t s_t.$$

For the aggressive filter 360, it is assumed the output power is dominated by the misalignment term, and that near-end signal is low. To prevent an infinite confidence estimate, the noise estimate is not allowed in an exemplary embodiment to go below a given fraction $\epsilon$ of the output power. The aggressive estimate of misalignment is then the following:

$$m_t = \frac{p_t - \epsilon p_t}{s_t}.$$

With this background in place, exemplary operation of the two parallel filters is described.

Exemplary parameters being used include the following
1) Memory length $P \geq 2$.
2) Power averaging step size $0 < \mu < 1$.
3) Minimum misalignment ratio $\epsilon > 0$.
4) Test threshold $0 < \beta < 1$.
5) Multiplicative factor $\gamma > 1$.
6) Update period T.

One possible initialization process is as follows. At time t=1, the two echo filters 310, 360 have the same value: $w_0^{(1)} = w_0^{(2)}$, Set initial misalignment estimate $m_0^{(1)} = \infty$. Set initial variables $p_0^{(j)}$, $\tilde{p}_0^{(j)}$, $s_0$ all equal to zero.

Figure 4:
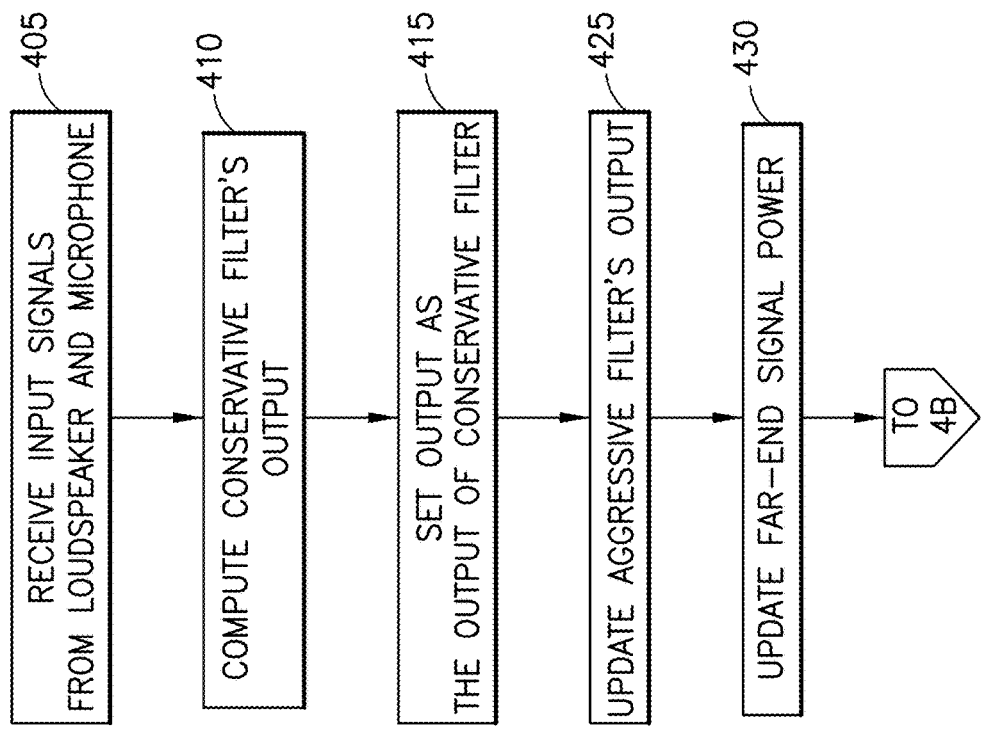
FIG. 4, spread over
Figure 4:
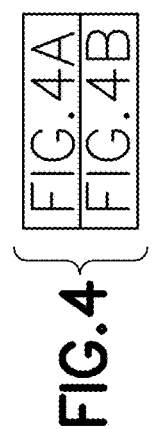

An exemplary general update process is now described. FIG. 4, spread over FIGS. 4A and 4B, is a logic flow diagram of a general update process for Embodiment 2. FIG. 4 illustrates the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 4 are assumed to be performed by a communication device 110, under control of the AEC 90 and the control module 140.

In block 405, the communication device 110 receives input signals from the loudspeaker(s) and microphone(s). The communication device 110 computes filter outputs $e_t^{(j)} = y_t - w_t^{(j)T} x_t$, for $j \in \{1,2\}$. See blocks 410 and 425. Note that j=1 for the conservative filter 310 and j=2 for the aggressive filter 360. Set the echo canceller output to $e_t = e_t^{(1)}$, which sets the output as the output of the conservative filter 310. See block 415.

Update far-end signal strength $s_t = (1-\mu)s_{t-1} + \mu x_t^T x_t$. See block 430.

In blocks 455 and 435, the power levels are updated for the conservative filter and aggressive filter, respectively, as follows: $p_t^{(j)}=(1-\mu)p_{t-1}^{(j)}+\mu(e_t^{(j)})^2$, for $j \in \{1,2\}$. These blocks use the power estimators 330 and 340, respectively.

In block 440, the aggressive misalignment estimate may be calculated as $m_t^{(2)}=(1-\epsilon)p_t^{(2)}/s_t$. This formula is an upper bound on the misalignment given the observations; together with the equation for $c_2$ below, this yields an upper bound on the RFNR. The conservative misalignment estimate is calculated as $m_t^{(1)}=\min(m_{t-1}^{(1)}, m_t^{(2)})$ in block 460. This formula provides a low estimate of the misalignment, based on history of the low estimate and of the aggressive estimate. Together with the equation for $c_1$ below, this yields the first estimate for the RFNR.

Intuitively, a reasonably low value for the estimate of the ratio may be based on assuming that the misalignment (that is, error in estimating coefficients) is the same as the misalignment was in the past. Another way to define a reasonably low value of the estimate is as being significantly lower than the aggressive estimate, e.g., by a factor of ten. It is important to note, however, that the confidence parameter estimates are not always different. It can be, however, important to performance that they are sometimes very different.

In blocks 465 and 445, confidence parameter estimates are calculated for the conservative filter and the aggressive filter, respectively, as $$c_j = \frac{m_t^{(j)}}{\max\{p_t^{(j)} - m_t^{(j)}s_t, \epsilon\rho_t^{(j)}\}}$$

for $j \in \{1,2\}$. The term "confidence parameter" is used, as this indicates how confident the system is that the measurement $y_t$ carries useful information about the echo channel. When there is more confidence in the measurement, larger step sizes may be taken. Similarly, when there is less confidence in the measurement, smaller step sizes may be taken.

The filter $w_t^{(j)}$ is updated using the IML equations with confidence parameter $c_j$ for $j \in \{1,2\}$. This is illustrated by block 470, where the conservative echo filter's weights are updated, and by block 450, where the aggressive echo filter's weights are updated.

Additional possible actions include the following.

Calculate the coefficients used to form the microphone signal as follows: $b_t^{(j)}=(U_{t-1}^T U_{t-1}+c_j^{-1}I_{P-1})^{-1}U_{t-1}^T x_t$ for $j \in \{1,2\}$.

Calculate the near-end signal strength as the following: $v_t^{(j)}=x_t-U_{t-1}b_t^{(j)}$ for $j \in \{1,2\}$.

Additional side tasks include updating transformed estimates.

1) $\tilde{x}_t=v_t^{(2)}$, $\tilde{y}_t=y_t-[y_{t-1}, \ldots, y_{t-P+1}]b_t^{(2)}$.
2) $\tilde{e}_t^{(j)}=\tilde{y}_t-w_t^{(j)}\tilde{x}_t$ for $j \in \{1,2\}$.
3) $\tilde{p}_t^{(j)}=(1-\mu)\tilde{p}_{t-1}^{(j)}+\mu(\tilde{e}_t^{(j)})^2$.
4) Calculate $\alpha_t^{(j)}=(c_j^{-1}+x_t^T v_j^{(j)})^{-1}$.
5) Calculate $w_{t+1}^{(j)}=w_t^{(j)}+v_t^{(j)}\alpha_t^{(j)}(y_t-x_t^T w_t^{(j)})$.

For the power level in (3), this is a running estimate of the average power level of the filter output signal, obtained by exponential averaging.

Figure 5:
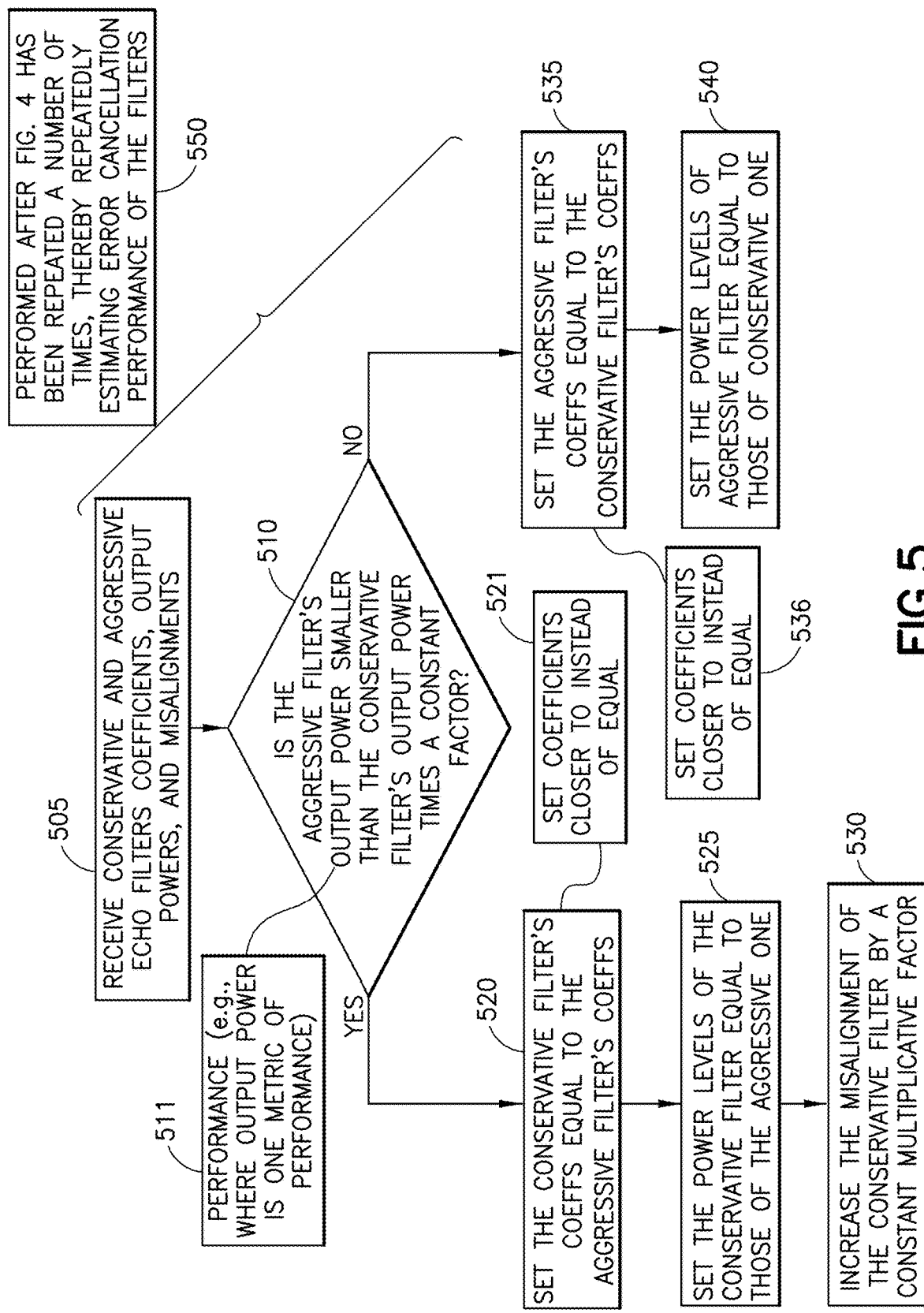
FIG. 5 is a logic flow diagram of the periodic update rule of Embodiment 2.

There is also a periodic update step, which is described in reference to FIG. 5. FIG. 5 is a logic flow diagram of the periodic update rule of Embodiment 2. FIG. 5 illustrates the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 5 are assumed to be performed by a communication device 110, under control of the AEC 90 and the control module 140.

Block 550 indicates that FIG. 5 is performed after FIG. 4 has been repeated a number of times, thereby repeatedly estimating error cancellation performance of the filters. The number of times determines the periodicity, examples of such are described now.

Periodically (for example when t=kT for some update period T and any integer k), the two filters are compared and synchronized. See also the periodic synchronization block 335 from FIG. 3. This process may have a constant factor $\beta<1$ and multiplicative factor $\gamma>1$.

In block 505, the conservative and aggressive echo filters coefficients, output powers, and misalignments are received in block 505. In block 510, it is determined by the communication device 110 if the aggressive filter's output power is smaller than the conservative filter's output power times a constant factor. If $\tilde{p}_t^{(2)}<\beta\tilde{p}_t^{(1)}$ block 510=Yes), the aggressive filter is deemed to be performing better than the conservative filter.

In response, execute the following.

Set $w_t^{(1)}=w_t^{(2)}$. This sets the conservative filter's coefficients (coeffs) equal to the aggressive filter's coefficients (coeffs). See block 520.

Set $\tilde{p}_t^{(1)}=\tilde{p}_t^{(2)}$, and set $p_t^{(1)}=p_t^{(2)}$. That is, the power levels of the conservative filter are set equal to those of the aggressive filter. See block 525.

Set $m_t^{(1)}=\gamma m_t^{(1)}$ (increase the conservative estimate of misalignment). This is indicated by block 530, where the misalignment of the conservative filter by a constant multiplicative factor.

Otherwise (block 510=No), the conservative filter is deemed to be the best. Execute the following in response.

Set $w_t^{(2)}=w_t^{(1)}$. This is illustrated by block 535, where the aggressive filter's coefficients are set equal to the conservative filter's coefficients.

Set $\tilde{p}_t^{(2)}=\tilde{p}_t^{(1)}$, and set $p_t^{(2)}=p_t^{(1)}$. This occurs in block 540, where the power levels of the aggressive filter are set equal to the conservative filter.

In blocks 520 and 535 above, the coefficients of the worse filter are set equal to the coefficients of the better filter. This is, however, only one option. As blocks 521, 536 indicate, the coefficients may instead be set "closer to" the other coefficients. For example, one could set the coefficients of the worse filter to be the average of the coefficients of both filters. This would bring the coefficients closer to the coefficients of the better filter, but in a more gradual way. That is, the term "closer to" can be defined as reducing a vector norm of the difference between coefficients of the two filters (considering the coefficients of each filter to be described by a vector w).

Furthermore, although output power is used in block 510, performance may be used instead. See block 511. Performance can be determined as a lower output power of echo canceller means better performance. There could be other performance metrics, and power output is one exemplary metric of performance.

Figure 6:
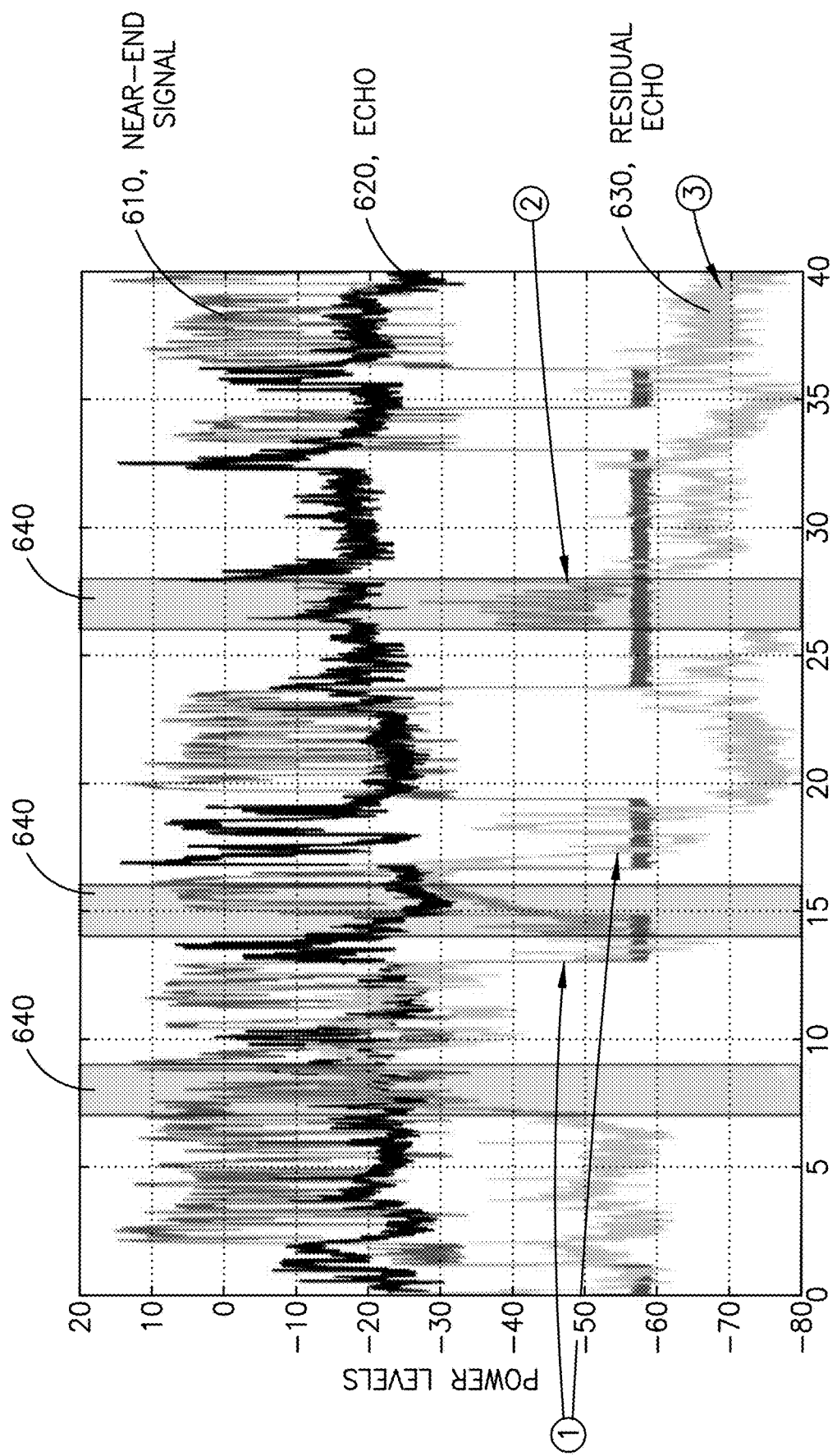
FIG. 6 illustrates an evolution of signal powers in a simulated SISO echo cancellation scenario, using echo cancellation with two parallel filters running the IML algorithm in an exemplary embodiment.
Figure 7:
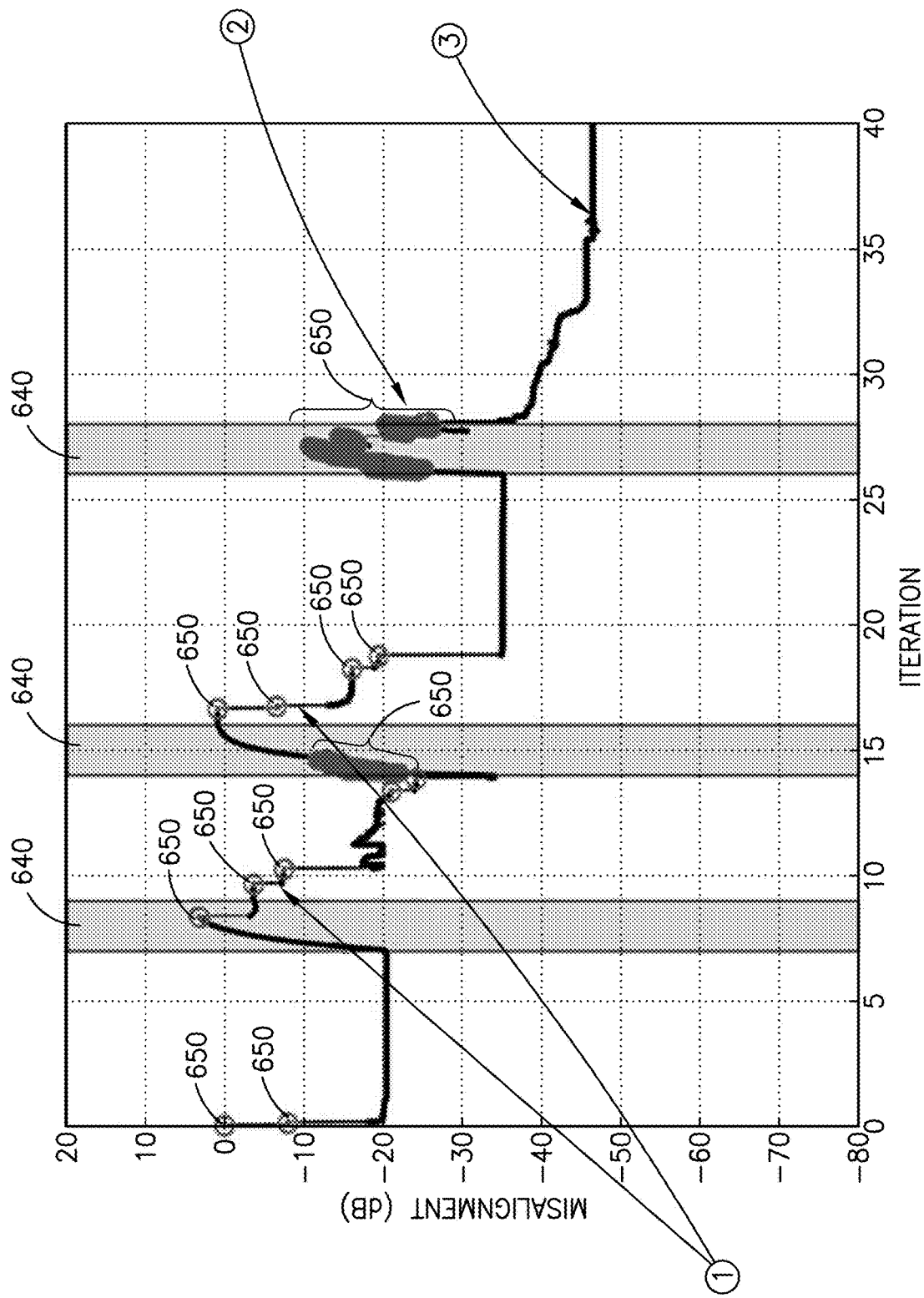
FIG. 7 illustrates evolution of the normalized misalignment $20 \log_{10} \|w_t - w^*\| - 20 \log_{10} \|w^*\|$ in the simulated SISO echo cancellation scenario of FIG. 6, using echo cancellation with two parallel filters running the IML algorithm, in an exemplary embodiment.

To illustrate the technical effects of an embodiment without voice activity detection, performance results from an echo cancellation simulation are depicted in FIGS. 6 and 7. In this simulation, the far-end signal is a continuous voice signal and the near-end signal is an intermittent voice signal, plus a small amount of background noise. The echo channel, from a single loudspeaker to a single microphone, is a typical room acoustic echo response. The channel is normally constant, but at three different time intervals (7-9 seconds (s), 14-16 s, and 26-28 s), the channel changes significantly.

FIG. 6 shows the strength of the far-end signal, the near-end signal, and the residual echo as a function of time. This figure illustrates evolution of signal powers in a simulated SISO echo cancellation scenario, using echo cancellation with two parallel filters running the IML algorithm. In reference 610, the near-end signal strength (intermittent voice plus background noise) is presented. In reference 620, the echo signal strength (voice far-end signal as received at the near-end microphone) is presented. In reference 630, the residual echo signal at the cancellation output is presented. Time intervals in which the echo channel is changing are highlighted by reference 640. Reference 1 indicates that if the channel changes when the near-end signal is high, tracking recovers as soon as the near-end signal is reduced. Reference 2 indicates that if the channel changes when the near-end signal is low, tracking is fast and effective. Reference 3 indicates that residual echo is unaffected by near-end signal, when the channel is fixed.

FIG. 7 shows the evolution of misalignment $20 \log_{10} \|w_t - w^*\| - 20 \log_{10} \|w^*\|$ over time. References 1, 2, and 3 indicate the same as they did with respect to FIG. 6. The moments at which the aggressive filter is chosen over the conservative filter are highlighted by reference 650 in this figure—the conservative filter is selected at all other instances. Time intervals in which the echo channel is changing are highlighted by reference 640. FIG. 7 illustrates evolution of the normalized misalignment $20 \log_{10} \|w_t - w^*\| - 20 \log_{10} \|w^*\|$ in the simulated SISO echo cancellation scenario of FIG. 6, using echo cancellation with two parallel filters running the IML algorithm.

In periods with low near-end signal, the misalignment and residual echo rapidly decrease—for example near time 0 s (zero seconds) and time 17 s. In these periods, the algorithm is correctly using the aggressive filter, running IML with a high confidence parameter. When the near-end signal is strong and the channel is static, the accuracy of the echo channel is preserved—for example in the interval 1-5 s and 20-25 s. In these periods, the algorithm is correctly using the conservative filter, running IML with a low confidence parameter. When the channel is changing, the misalignment temporarily increases. When the channel change occurs during a period of low near-end activity (cf 26-28 s), the filter can adapt quickly enough to maintain low residual echo. When the channel change occurs during a period of high near-end activity (cf 7-9 s), the filter necessarily must wait for a break in the near-end signal in order to learn the new echo channel.

This example illustrated how an echo canceller, implementing the IML update algorithm in two parallel branches, can achieve rapid tracking, low residual echo, robustness to near-end signals, and low complexity.

To summarize, certain of the exemplary embodiments may have one or more of the following advantages and technical effects.

1) Fast convergence when residual error is high (like APA, RLS), because IML fully exploits information from the most recent P measurements when confidence in the measurements is high.

2) Small asymptotic residual error (like small-step LMS), because IML averages out fluctuations from the near-end signal, when confidence in the measurements is low.

3) Automatic adaptation to near-end activity, using VAD (Embodiment 1) or without VAD (Embodiment 2), due to a theoretical understanding of the optimal setting of the confidence parameter.

4) Low computational complexity (linear in filter length), because IML uses the same computational framework as APA.

In some embodiments, echo cancellation may be performed using filter banks, where the microphone signals and loudspeaker signals are passed through two or more parallel filters with complementary passbands to generate multiple subband sequences, where echo cancellation is performed independently and in parallel within each subband, and where the outputs of echo cancellation in each subband are combined to generate the final output sequence in the time domain. In this case, the examples as described previously can be used directly on the sequence in each subband.

In some embodiments, such as when using filter banks based on the Discrete Fourier Transform (DFT), or when using a baseband representation for a carrier-modulated signal, the loudspeaker and microphone signals, and estimated channel coefficients may be represented as complex values rather than real values. The formulas presented previously extend naturally to the complex case, as would be apparent to those skilled in the art. For example, formulas for the previously described $\alpha_t$ (the normalization factor parameter) and $w_{t+1}$ in paragraph would be replaced by the following:

$$\alpha_t = (\|x_t\|^2 + c_t^{-1} - x_t^H U_{t-1}(c_t^{-1} I_{P-1} + U_{t-1}^H U_{t-1})^{-1} U_{t-1}^H x_t)^{-1}, \text{ and}$$

$$w_{t+1} = w_t + \alpha_t (I_L - U_{t-1}(U_{t-1}^H U_{t-1} + c_t^{-1} I_{P-1})^{-1} U_{t-1}^H) x_t (y_t - x_t^H w_t),$$

where $A^H$ represents the Hermitian transpose of complex matrix or vector A.

Figure 8:
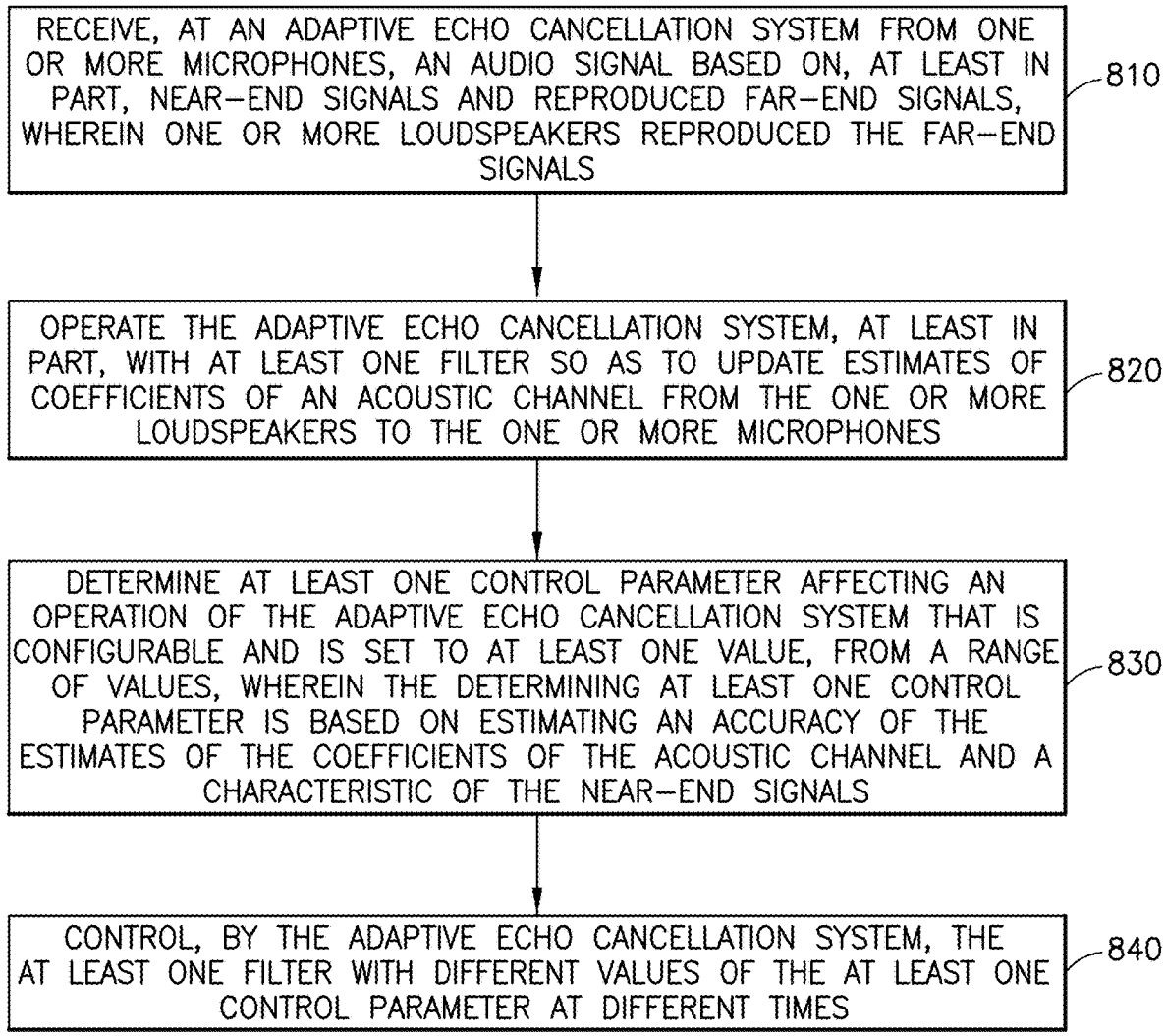
FIG. 8 is a logic flow diagram for acoustic echo cancellation using a control parameter, and illustrates the operation of an exemplary method or methods, a result of execution of computer program instructions embodied on a computer readable memory, functions performed by logic implemented in hardware, and/or interconnected means for performing functions in accordance with exemplary embodiments.

Turning to FIG. 8, this figure is a logic flow diagram for acoustic echo cancellation using a control parameter. This figure also illustrates the operation of an exemplary method or methods, a result of execution of computer program instructions embodied on a computer readable memory, functions performed by logic implemented in hardware, and/or interconnected means for performing functions in accordance with exemplary embodiments. This figure is assumed to be performed by the communication device 110, using the AEC 90.

In block 810, an operation is performed to receive, at an adaptive echo cancellation system from one or more microphones, an audio signal based on, at least in part, near-end signals and reproduced far-end signals. One or more loudspeakers reproduced the far-end signals.

In block 820, an operation is performed to operate the adaptive echo cancellation system, at least in part, with at least one filter so as to update estimates of coefficients of an acoustic channel from the one or more loudspeakers to the one or more microphones. Determination is made in block 830 of at least one control parameter affecting an operation of the adaptive echo cancellation system that is configurable and is set to at least one value, from a range of values. The determining at least one control parameter is based on estimating an accuracy of the estimates of the coefficients of the acoustic channel and a characteristic of the near-end signals.

In block 840, a control operation is performed by the adaptive echo cancellation system to control the at least one filter with different values of the at least one control parameter at different times.

Additional examples are now presented.

Example 2

The method of the example in FIG. 8, wherein at least one filter comprises a first filter and a second filter, and wherein one value of the different values used at a first time on the first filter is different from another value of the different values used at the first time on the second filter.

Example 3

The method of example 2, wherein the controlling the at least one filter with different values of the at least one control parameter at different times further comprises:

controlling the first filter and second filter with different values of corresponding first and second respective control parameters that affect a rate of change of the corresponding estimates of the coefficients of the acoustic channel, wherein a value of the first control parameter set for the first filter causes the channel coefficient estimates to change at a slower rate than a rate of change caused by a value of the second control parameter set for the second filter;

repeatedly estimating error cancellation performance of the first and second filters; and updating, after the repeated estimation, the coefficients of the first or second filter estimated to have lower performance to be closer to the coefficients of the other of the first or second filter estimated to have higher performance.

Example 4

The method of example 3, wherein the updating further comprises updating the coefficients of the first or second filter estimated to have lower performance to be equal to the coefficients of the other of the first or second filter estimated to have higher performance.

Example 5

The method of example 3, wherein the performance is characterized by output power.

Example 6

The method of example 3, wherein controlling the first filter and second filter of the at least two filters with different values of corresponding first and second respective control parameters further comprises:

determining two estimates of residual far-end to near-end ratio:
a first estimate of the residual far-end to near-end ratio based on past history of the first estimate and of a second estimate, the first estimate selected as being a reasonably low value of the ratio;
the second estimate being an upper bound on the residual far-end to near-end ratio, selected as a highest value the upper bound could be, based on observations of signals from the one or more microphones and the far-end signals;
setting the first confidence parameter of the first adaptive filter to the first estimate;
setting the second confidence parameter of the second adaptive filter to the second estimate.

Example 7

The method of example 6, wherein the first estimate is selected as being a reasonably low value of the ratio as being significantly lower by a factor than the second estimate.

Example 8

The method of example 3, further comprising setting an estimated power level of the first or second filter estimated to have lower performance to equal to the power level of the other of the first or second filter estimated to have higher performance.

Example 9

The method of example 3, further comprising increasing an estimated misalignment of the first filter in response to the second filter being estimated to have lower performance than the first filter.

Example 10

The method of example 9, wherein increasing the estimated misalignment of the first filter further comprises increasing the estimated misalignment of the first filter by a constant multiplicative factor.

Example 11

The method of the example in FIG. 8, wherein the characteristic of the near-end signals comprises signal strength of the near-end signals.

Example 12

The method of example 11, wherein the signal strength is characterized by average power of the near-end signals.

Example 13

The method of the example in FIG. 8, wherein the determining at least one control parameter is based on estimating a ratio of a measure of an error in the estimates of the coefficients of the acoustic channel to a measure of a strength of the near-end signals.

Example 14

The method of the example in FIG. 8, wherein a first value of the different values used at a first time is different from a second value of the different values used at a second time.

Example 15

A computer program, comprising code for performing the methods of any of examples 1 to 14, when the computer program is run on a computer.

Example 16

The computer program of example 15, wherein the computer program is a computer program product comprising a computer-readable medium bearing computer program code embodied therein for use with the computer.

Example 17

The computer program of example 15, wherein the computer program is directly loadable into an internal memory of the computer.

Example 18

An apparatus for echo cancellation of a two-way audio communication, comprising means for performing:
receiving, at an adaptive echo cancellation system from one or more microphones, an audio signal based on, at least in part, near-end signals and reproduced far-end signals, wherein one or more loudspeakers reproduced the far-end signals;
operating the adaptive echo cancellation system, at least in part, with at least one filter so as to update estimates of coefficients of an acoustic channel from the one or more loudspeakers to the one or more microphones;
determining at least one control parameter affecting an operation of the adaptive echo cancellation system that is configurable and is set to at least one value, from a range of values, wherein the determining at least one control parameter is based on estimating an accuracy of the estimates of the coefficients of the acoustic channel and a characteristic of the near-end signals; and
controlling, by the adaptive echo cancellation system, the at least one filter with different values of the at least one control parameter at different times.

Example 19

The apparatus of example 15, wherein at least one filter comprises a first filter and a second filter, and wherein one value of the different values used at a first time on the first filter is different from another value of the different values used at the first time on the second filter.

Example 20

The apparatus of example 16, wherein the controlling the at least one filter with different values of the at least one control parameter at different times further comprises:
controlling the first filter and second filter with different values of corresponding first and second respective control parameters that affect a rate of change of the corresponding estimates of the coefficients of the acoustic channel, wherein a value of the first control parameter set for the first filter causes the channel coefficient estimates to change at a slower rate than a rate of change caused by a value of the second control parameter set for the second filter;
repeatedly estimating error cancellation performance of the first and second filters; and
updating, after the repeated estimation, the coefficients of the first or second filter estimated to have lower performance to be closer to the coefficients of the other of the first or second filter estimated to have higher performance.

Example 21

The apparatus of example 17, wherein the updating further comprises updating the coefficients of the first or second filter estimated to have lower performance to be equal to the coefficients of the other of the first or second filter estimated to have higher performance.

Example 22

The apparatus of example 17, wherein the performance is characterized by output power.

Example 23

The apparatus of example 17, wherein controlling the first filter and second filter of the at least two filters with different values of corresponding first and second respective control parameters further comprises:
determining two estimates of residual far-end to near-end ratio:
a first estimate of the residual far-end to near-end ratio based on past history of the first estimate and of a second estimate, the first estimate selected as being a reasonably low value of the ratio;
the second estimate being an upper bound on the residual far-end to near-end ratio, selected as a highest value the upper bound could be, based on observations of signals from the one or more microphones and the far-end signals;
setting the first confidence parameter of the first adaptive filter to the first estimate;
setting the second confidence parameter of the second adaptive filter to the second estimate.

Example 24

The apparatus of example 20, wherein the first estimate is selected as being a reasonably low value of the ratio as being significantly lower by a factor than the second estimate.

Example 25

The apparatus of example 17, wherein the means are further configured to perform setting an estimated power level of the first or second filter estimated to have lower performance to equal to the power level of the other of the first or second filter estimated to have higher performance.

Example 26

The apparatus of example 17, wherein the means are further configured to perform increasing an estimated misalignment of the first filter in response to the second filter being estimated to have lower performance than the first filter.

Example 27

The apparatus of example 23, wherein increasing the estimated misalignment of the first filter further comprises increasing the estimated misalignment of the first filter by a constant multiplicative factor.

Example 28

The apparatus of example 15, wherein the characteristic of the near-end signals comprises signal strength of the near-end signals.

Example 29

The apparatus of example 25, wherein the signal strength is characterized by average power of the near-end signals.

Example 30

The apparatus of example 15, wherein the determining at least one control parameter is based on estimating a ratio of a measure of an error in the estimates of the coefficients of the acoustic channel to a measure of a strength of the near-end signals.

Example 31

The apparatus of example 15, wherein a first value of the different values used at a first time is different from a second value of the different values used at a second time.

Example 32

The apparatus of any preceding apparatus example, wherein the means comprises:
at least one processor; and
at least one memory including computer program code, the at least one memory and computer program code configured to, with the at least one processor, cause the performance of the apparatus.

Example 33

An apparatus for echo cancellation of a two-way audio communication, comprising:
one or more processors; and
one or more memories including computer program code, wherein the one or more memories and the computer program code are configured, with the one or more processors, to cause the apparatus to:
receive, at an adaptive echo cancellation system from one or more microphones, an audio signal based on, at least in part, near-end signals and reproduced far-end signals, wherein one or more loudspeakers reproduced the far-end signals;
operate the adaptive echo cancellation system, at least in part, with at least one filter so as to update estimates of coefficients of an acoustic channel from the one or more loudspeakers to the one or more microphones;
determine at least one control parameter affecting an operation of the adaptive echo cancellation system that is configurable and is set to at least one value, from a range of values, wherein the determining at least one control parameter is based on estimating an accuracy of the estimates of the coefficients of the acoustic channel and a characteristic of the near-end signals; and
control, by the adaptive echo cancellation system, the at least one filter with different values of the at least one control parameter at different times.

Example 34

The apparatus of example 33, wherein at least one filter comprises a first filter and a second filter, and wherein one value of the different values used at a first time on the first filter is different from another value of the different values used at the first time on the second filter.

Example 35

The apparatus of example 34, wherein the controlling the at least one filter with different values of the at least one control parameter at different times further comprises:
controlling the first filter and second filter with different values of corresponding first and second respective control parameters that affect a rate of change of the corresponding estimates of the coefficients of the acoustic channel, wherein a value of the first control parameter set for the first filter causes the channel coefficient estimates to change at a slower rate than a rate of change caused by a value of the second control parameter set for the second filter;
repeatedly estimating error cancellation performance of the first and second filters; and
updating, after the repeated estimation, the coefficients of the first or second filter estimated to have lower performance to be closer to the coefficients of the other of the first or second filter estimated to have higher performance.

Example 36

The apparatus of example 35, wherein the updating further comprises updating the coefficients of the first or second filter estimated to have lower performance to be equal to the coefficients of the other of the first or second filter estimated to have higher performance.

Example 37

The apparatus of example 35, wherein the performance is characterized by output power.

Example 38

The apparatus of example 35, wherein controlling the first filter and second filter of the at least two filters with different values of corresponding first and second respective control parameters further comprises:
determining two estimates of residual far-end to near-end ratio:
a first estimate of the residual far-end to near-end ratio based on past history of the first estimate and of a second estimate, the first estimate selected as being a reasonably low value of the ratio;
the second estimate being an upper bound on the residual far-end to near-end ratio, selected as a highest value the upper bound could be, based on observations of signals from the one or more microphones and the far-end signals;
setting the first confidence parameter of the first adaptive filter to the first estimate;
setting the second confidence parameter of the second adaptive filter to the second estimate.

Example 39

The apparatus of example 38, wherein the first estimate is selected as being a reasonably low value of the ratio as being significantly lower by a factor than the second estimate.

Example 40

The apparatus of example 35, wherein the one or more memories and the computer program code are further configured, with the one or more processors, to cause the apparatus to set an estimated power level of the first or second filter estimated to have lower performance to equal to the power level of the other of the first or second filter estimated to have higher performance.

Example 41

The apparatus of example 35, wherein the one or more memories and the computer program code are further configured, with the one or more processors, to cause the apparatus to increase an estimated misalignment of the first filter in response to the second filter being estimated to have lower performance than the first filter.

Example 42

The apparatus of example 41, wherein increasing the estimated misalignment of the first filter further comprises increasing the estimated misalignment of the first filter by a constant multiplicative factor.

Example 43

The apparatus of example 33, wherein the characteristic of the near-end signals comprises signal strength of the near-end signals.

Example 44

The apparatus of example 43, wherein the signal strength is characterized by average power of the near-end signals.

Example 45

The apparatus of example 33, wherein the determining at least one control parameter is based on estimating a ratio of a measure of an error in the estimates of the coefficients of the acoustic channel to a measure of a strength of the near-end signals.

Example 46

The apparatus of example 33, wherein a first value of the different values used at a first time is different from a second value of the different values used at a second time.

Example 47

A computer program product comprising a computer-readable storage medium bearing computer program code embodied therein for use with a computer, the computer program code comprising:
  code for receiving, at an adaptive echo cancellation system from one or more microphones, an audio signal based on, at least in part, near-end signals and reproduced far-end signals, wherein one or more loudspeakers reproduced the far-end signals;
  code for operating the adaptive echo cancellation system, at least in part, with at least one filter so as to update estimates of coefficients of an acoustic channel from the one or more loudspeakers to the one or more microphones;
  code for determining at least one control parameter affecting an operation of the adaptive echo cancellation system that is configurable and is set to at least one value, from a range of values, wherein the determining at least one control parameter is based on estimating an accuracy of the estimates of the coefficients of the acoustic channel and a characteristic of the near-end signals; and
  code for controlling, by the adaptive echo cancellation system, the at least one filter with different values of the at least one control parameter at different times.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1A. A computer-readable medium may comprise a computer-readable storage medium (e.g., memories 125 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

5G fifth generation
AEC Acoustic Echo Cancellation or Acoustic Echo Canceller
APA Affine Projection Algorithm
cf compare
coeffs coefficients
CP Confidence Parameter
IML Incremental Maximum Likelihood
JO-NLMS Jointly Optimized Normalized Least Mean Square
LMS Least Mean Square
Mic microphone
MIMO Multiple Input, Multiple Output
MISO Multiple Input, Single Output
MLE Maximum Likelihood Estimation
NLMS Normalized Least Mean Square
NP-NLMS Non-parametric Normalized Least Mean Square
R-APA Regularized Affine Projection Algorithm
RFNR Residual Far-end to Near-end Ratio
RLS Recursive Least Square
s seconds
SISO Single Input, Single Output
VAD Voice Activity Detection
WOLA Weighted Overlap-Add

What is claimed is:

1. A method for echo cancellation of a two-way audio communication, comprising:
    receiving, at an adaptive echo cancellation system from one or more microphones, an audio signal based on near-end signals and reproduced far-end signals, wherein one or more loudspeakers reproduced the far-end signals;
    operating the adaptive echo cancellation system with at least one filter so as to update estimates of coefficients of an acoustic channel from the one or more loudspeakers to the one or more microphones;
    determining at least one control parameter affecting an operation of the adaptive echo cancellation system that is configurable and is set to at least one value, from a range of values, wherein the determining at least one control parameter is based on estimating an accuracy of the estimates of the coefficients of the acoustic channel and a characteristic of the near-end signals; and
    controlling, by the adaptive echo cancellation system, the at least one filter with different values of the at least one control parameter at different times, wherein the at least one filter produces an output signal and the adaptive echo cancellation system performs the echo cancellation by subtracting the output signal from a signal from the one or more microphones.

2. The method of claim 1, wherein at least one filter comprises a first filter and a second filter, and wherein one value of the different values used at a first time on the first filter is different from another value of the different values used at the first time on the second filter.

3. The method of claim 2, wherein the controlling the at least one filter with different values of the at least one control parameter at different times further comprises:
    controlling the first filter and second filter with different values of corresponding first and second respective control parameters that affect a rate of change of corresponding estimates of the coefficients of the acoustic channel, wherein a value of the first control parameter set for the first filter causes the estimates of the coefficients of the acoustic channel to change at a slower rate than a rate of change caused by a value of the second control parameter set for the second filter;
    estimating error cancellation performance of the first and second filters; and
    updating, after the estimation, the coefficients of the first or second filter estimated to have lower performance to be closer to the coefficients of the other of the first or second filter estimated to have higher performance.

4. The method of claim 3, wherein the updating further comprises updating the coefficients of the first or second filter estimated to have lower performance to be at least substantially equal to the coefficients of the other of the first or second filter estimated to have higher performance.

5. The method of claim 3, wherein controlling the first filter and second filter with different values of corresponding first and second respective control parameters further comprises:
    determining two estimates of residual far-end to near-end ratio:
        a first estimate of the residual far-end to near-end ratio based on past history of the first estimate and of a second estimate, the first estimate selected as being a low value of the far-end to near-end ratio;
        the second estimate being an upper bound on the residual far-end to near-end ratio, selected as a highest value the upper bound could be, based on observations of signals from the one or more microphones and the far-end signals;
    setting a first confidence parameter of the first filter to the first estimate;
    setting a second confidence parameter of the second filter to the second estimate.

6. The method of claim 3, further comprising at least one of: setting an estimated power level of the first or second filter estimated to have lower performance to be substantially equal to the power level of the other of the first or second filter estimated to have higher performance; or increasing an estimated misalignment of the first filter in response to the second filter being estimated to have lower performance than the first filter.

7. The method of claim 6, wherein increasing the estimated misalignment of the first filter further comprises increasing the estimated misalignment of the first filter by a constant multiplicative factor.

8. The method of claim 1, wherein the characteristic of the near-end signals comprises signal strength of the near-end signals.

9. The method of claim 1, wherein the determining at least one control parameter is based on estimating a ratio of a measure of an error in the estimates of the coefficients of the acoustic channel to a measure of a strength of the near-end signals.

10. An apparatus for echo cancellation of a two-way audio communication, comprising:
    one or more processors; and
    one or more memories storing instructions that, when executed by the one or more processors, cause the apparatus at least to:
    receive, at an adaptive echo cancellation system from one or more microphones, an audio signal based on near-end signals and reproduced far-end signals, wherein one or more loudspeakers reproduced the far-end signals;
    operate the adaptive echo cancellation system with at least one filter so as to update estimates of coefficients of an acoustic channel from the one or more loudspeakers to the one or more microphones;

determine at least one control parameter affecting an operation of the adaptive echo cancellation system that is configurable and is set to at least one value, from a range of values, wherein the determining at least one control parameter is based on estimating an accuracy of the estimates of the coefficients of the acoustic channel and a characteristic of the near-end signals; and control, by the adaptive echo cancellation system, the at least one filter with different values of the at least one control parameter at different times, wherein the at least one filter produces an output signal and the adaptive echo cancellation system performs the echo cancellation by subtracting the output signal from a signal from the one or more microphones.

11. The apparatus of claim 10, wherein at least one filter comprises a first filter and a second filter, and wherein one value of the different values used at a first time on the first filter is different from another value of the different values used at the first time on the second filter.

12. The apparatus of claim 11, wherein the controlling the at least one filter with different values of the at least one control parameter at different times further comprises:

controlling the first filter and second filter with different values of corresponding first and second respective control parameters that affect a rate of change of corresponding estimates of the coefficients of the acoustic channel, wherein a value of the first control parameter set for the first filter causes the estimates of the coefficients of the acoustic channel to change at a slower rate than a rate of change caused by a value of the second control parameter set for the second filter;

repeatedly estimating error cancellation performance of the first and second filters; and updating, after the repeated estimation, the coefficients of the first or second filter estimated to have lower performance to be closer to the coefficients of the other of the first or second filter estimated to have higher performance.

13. The apparatus of claim 12, wherein the updating further comprises updating the coefficients of the first or second filter estimated to have lower performance to be at least substantially equal to the coefficients of the other of the first or second filter estimated to have higher performance.

14. The apparatus of claim 12, wherein controlling the first filter and second filter with different values of corresponding first and second respective control parameters further comprises:

determining two estimates of residual far-end to near-end ratio:

a first estimate of the residual far-end to near-end ratio based on past history of the first estimate and of a second estimate, the first estimate selected as being a low value of the far-end to near-end ratio;

the second estimate being an upper bound on the residual far-end to near-end ratio, selected as a highest value the upper bound could be, based on observations of signals from the one or more microphones and the far-end signals;

setting a first confidence parameter of the first filter to the first estimate;

setting a second confidence parameter of the second filter to the second estimate.

15. The apparatus of claim 14, wherein the first estimate is selected as being a low value of the far-end to near-end ratio as being significantly lower by a factor than the second estimate.

16. The apparatus of claim 12, wherein the one or more memories and the computer program code are further configured, with the one or more processors, to cause the apparatus to perform at least one of: setting an estimated power level of the first or second filter estimated to have lower performance to be substantially equal to the power level of the other of the first or second filter estimated to have higher performance; or increasing an estimated misalignment of the first filter in response to the second filter being estimated to have lower performance than the first filter.

17. The apparatus of claim 10, wherein the characteristic of the near-end signals comprises signal strength of the near-end signals.

18. The apparatus of claim 10, wherein the determining at least one control parameter is based on estimating a ratio of a measure of an error in the estimates of the coefficients of the acoustic channel to a measure of a strength of the near-end signals.

19. The apparatus of claim 10, wherein a first value of the different values used at a first time is different from a second value of the different values used at a second time.

20. The apparatus of claim 10, wherein control of the at least one filter controls the at least one filter with different values of the at least one control parameter that affect a rate of change of corresponding estimates of the coefficients of the acoustic channel.

* * * * *